(12) United States Patent
Komatsu et al.

(10) Patent No.: US 10,252,692 B2
(45) Date of Patent: Apr. 9, 2019

(54) AIRBAG DEVICE AND MANUFACTURING METHOD THEREOF

(71) Applicant: TOYODA GOSEI CO., LTD., Kiyosu-shi, Aichi-ken (JP)

(72) Inventors: Takanori Komatsu, Kiyosu (JP); Mikine Hayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 50 days.

(21) Appl. No.: 15/347,184

(22) Filed: Nov. 9, 2016

(65) Prior Publication Data
US 2017/0136979 A1  May 18, 2017

(30) Foreign Application Priority Data
Nov. 13, 2015 (JP) ................................ 2015-223408

(51) Int. Cl.
*B60R 21/231* (2011.01)
*B60R 21/237* (2006.01)
(Continued)

(52) U.S. Cl.
CPC ........ *B60R 21/231* (2013.01); *B60R 21/2035* (2013.01); *B60R 21/2037* (2013.01);
(Continued)

(58) Field of Classification Search
CPC ................ B60R 21/231; B60R 21/237; B60R 21/2037; B60R 21/217; B60R 21/203; B60R 21/2035
(Continued)

(56) References Cited

U.S. PATENT DOCUMENTS 5,992,874 A    11/1999  Sugiyama et al.
7,758,065 B2 *  7/2010  Weigand ............... B60R 21/217
                                                280/728.2
(Continued)

FOREIGN PATENT DOCUMENTS

JP       10-71910 A      3/1998
JP       11-059309 A     3/1999
(Continued)

OTHER PUBLICATIONS

Office action dated Sep. 25, 2018 issued in corresponding JP patent application No. 2015-223408 (and English machine translation attached).

*Primary Examiner* — Keith J Frisby
(74) *Attorney, Agent, or Firm* — Posz Law Group, PLC

(57) ABSTRACT

An airbag device includes: an airbag having an inflow opening for introducing an inflation gas and being formed in a folded body; a bag holder attached to a peripheral edge of the inflow opening; an airbag cover attached to the bag holder; and an inflator disposed by inserting an upper side in the folded body from the inflow opening, wherein: the airbag cover has a ceiling wall that covers an upper surface remote from the inflow opening of the folded body; the folded body is equipped with a housing recess that is capable of housing a top of a main body unit of the inflator; a part around the housing recess is supported by the bag holder; and a ceiling surface of the housing recess is formed as a shape in which a clearance is provided between the top of the main body unit of the inserted inflator.

4 Claims, 21 Drawing Sheets

(51) Int. Cl.
*B60R 21/217* (2011.01)
*B60R 21/203* (2006.01)
*B60R 21/215* (2011.01)
*B60R 21/235* (2006.01)

(52) U.S. Cl.
CPC .......... *B60R 21/215* (2013.01); *B60R 21/217* (2013.01); *B60R 21/2176* (2013.01); *B60R 21/235* (2013.01); *B60R 21/237* (2013.01); *B60R 2021/23533* (2013.01)

(58) Field of Classification Search
USPC ........................................................ 280/731
See application file for complete search history.

(56) References Cited

U.S. PATENT DOCUMENTS

| | | |
|---|---|---|
| 2001/0028165 A1 | 10/2001 | Nishijima et al. |
| 2002/0052284 A1 | 5/2002 | Nishijima et al. |
| 2002/0053791 A1 | 5/2002 | Nishijima et al. |
| 2003/0171200 A1 | 9/2003 | Nishijima et al. |
| 2005/0209080 A1 | 9/2005 | Nishijima et al. |
| 2013/0026741 A1* | 1/2013 | Onohara ............. B60R 21/2037 280/731 |
| 2015/0130167 A1 | 5/2015 | Kunkel et al. |

FOREIGN PATENT DOCUMENTS

| | | |
|---|---|---|
| JP | 2015-520065 A | 7/2015 |
| WO | 01/76917 A1 | 10/2001 |

\* cited by examiner

V-V SECTIONAL VIEW

AIRBAG DEVICE AND MANUFACTURING METHOD THEREOF

CROSS-REFERENCE TO RELATED APPLICATION(S)

This application is based upon and claims the benefit of priority from Japanese Patent Application No. 2015-223408, filed on Nov. 13, 2015, the entire contents of which are incorporated herein by reference.

BACKGROUND

1. Field of the Invention

The present invention relates to an airbag device for a driver's seat and a front passenger seat equipped with a folded body of an airbag, an airbag cover for covering the folded body, an inflator for supplying an inflation gas to the airbag, and a bag holder for holding the respective parts, and a method of manufacturing the same.

2. Description of the Related Art

Conventionally, as an airbag device of this type, there has been an airbag device equipped with an airbag having an inflow opening for introducing the inflation gas, a bag holder that attaches a peripheral edge of the inflow opening to hold the airbag, an airbag cover that covers the periphery of the folded body of the folded airbag and is attached to the bag holder, and an inflator for supplying an inflation gas to the airbag (e.g., see JP-A-11-59309 A). In the airbag device, the airbag cover is configured to be formed of synthetic resin such as olefin-based thermoplastic elastomer (TPO), to cover the upper surface remote from the inflow opening of the folded body, and to have a ceiling wall having a door that is pushed open to the airbag when inflated. Furthermore, in the airbag device, a floating type hone switch mechanism is provided on the lower side, and a plurality of ribs with different lengths is provided to protrude from the ceiling wall of the airbag cover, in correspondence with a curved shape of the upper surface of the folded body. Therefore, if the ceiling wall of the airbag cover is pressed down by the ribs, even when the ceiling wall having elasticity is partially deflected via the folded body abutting on the ribs, the airbag device is lowered, thereby making it possible to turn ON the horn switch mechanism.

As another airbag device, after folding the airbag so that the folded body of the airbag can maintain a compact folded shape, by compression molding while heating, the deployment and inflation are allowed at the time of inflow of the inflation gas, but there is a case of forming the airbag to have a shape retaining property that prevents an easier folding collapse (e.g., see JP-T-2015-520065).

However, in the conventional airbag device, even if the folded body that is compression-molded is compactly configured so as to have a shape retaining property, if a large clearance occurs between the folded body and the airbag cover for covering the folded body, until the airbag cover made of synthetic resin such as olefin-based thermoplastic elastomer (TPO) comes into contact with the folded body, the folded body is greatly depressed, thereby lowering the tactility of the airbag cover. In particular, in a case where the folded shape itself of the airbag becomes compact depending on selection of a base fabric of a constitution material or the presence or absence of reinforcing cloth, when a configuration in which the compact folded body is attached to the bag holder is provided, a further larger clearance is generated between the folded body and the airbag cover, thereby promoting the above-mentioned problems. In this case, although it is conceivable to provide the aforementioned ribs on the lower surface of the ceiling wall of the airbag cover to cope with the problem, there is a problem of taking much time by an increase in changing locations, rather than simply adjusting the airbag itself to be changed.

SUMMARY

The invention has been made to solve the aforementioned problems, and an object thereof to provide an airbag device that is capable of conveniently suppressing a decrease in tactility of the airbag cover for covering the folded body even when the folded body of the airbag is compact, and a method of manufacturing the same.

According to an aspect of the invention, there is provided an airbag device including: an airbag having an inflow opening for introducing an inflation gas, the airbag being formed in a folded body by being folded to be inflatable; a bag holder attached to a peripheral edge of the inflow opening, the bag holder configured to hold the airbag; an airbag cover covering a peripheral edge of the folded body, the airbag cover being attached to the bag holder; and an inflator disposed by inserting an upper side, on which a gas discharge port for discharging the inflation gas is disposed, in the folded body from the inflow opening, the inflator being held in the bag holder, wherein: the airbag cover has a ceiling wall that covers an upper surface remote from the inflow opening of the folded body, the ceiling wall having a door that is opened by being pushed to the airbag when inflated; the folded body is equipped with a housing recess that has a shape retaining property capable of supporting the ceiling wall of the airbag cover and is capable of housing a top of a main body unit of the inflator; a part around the housing recess is supported by the bag holder via the peripheral edge of the inflow opening; and a ceiling surface of the housing recess is formed as a shape in which a clearance is provided between the top of the main body unit of the inserted inflator.

In the airbag device according to the invention, the folded body of the airbag is configured to have the shape retaining property forms a ceiling surface of a housing recess of capable of housing the top of the main body unit of the inflator, between the top of the main body unit of the inserted inflator, as a shape providing a clearance, without changing the distance between the ceiling wall of the airbag cover on the top surface of the folded body, namely, without lowering the upper surface facing the ceiling wall, the reduced volume of the compact folded shape can be adjusted by increasing the volume of the housing recess. Therefore, even when pressing down the ceiling wall of the airbag cover, the ceiling wall is supported on the upper surface of the folded body having the shape retaining property, is not greatly bent, whereby the tactility of the ceiling wall of the airbag cover is not reduced. Of course, because the folded body itself also supports the part around the housing recess on the hag holder, via the peripheral edge of the inflow opening, the upper surface side of the folded body supporting the ceiling wall is not lowered, and as a result, the ceiling wall of the airbag cover supported by the upper surface of the folded body is not lowered, and the tactility of the ceiling wall is not reduced.

Thus, in the airbag device according to the invention, even if the folded body of the airbag is compact, by a simply treatment that provides a predetermined clearance between the top of the main body unit of the inflator at the ceiling surface of the housing recess, it is possible to suppress the reduction in tactility of the airbag cover that covers the folded body.

In the airbag device according to the invention, a clearance dimension between the ceiling surface of the housing, recess and the top of the main body unit of the inflator is desirably set to be larger than a clearance dimension between the upper surface of the folded body and the ceiling wall of the airbag cover.

In such a configuration, because the clearance dimension between the upper surface of the folded body and the ceiling wall of the airbag cover is smaller than the clearance dimension between the ceiling surface of the housing recess and the top of the main body unit of the inflator, if the ceiling wall of the airbag cover is lowered, the ceiling wall is immediately supported on the upper surface of the folded body having the shape retaining property. Thus, the recessed ceiling wall is restricted, and it is possible to obtain the excellent tactility of the ceiling wall.

In the airbag device according to the invention, the airbag cover desirably includes: the ceiling wall; and a side wall that extends downward from the peripheral edge of the door of the ceiling wall, covers an outer peripheral side of the folded body and is attached to the bag holder, and a horn switch mechanism is desirably disposed on a mounting part side of the bag holder, and is desirably disposed to be interposed between the bag holder and the mounting part for mounting the airbag device on the lower side of the bag holder, and is desirably configured to operate a horn by moving the bag holder downward to the mounting part side by an actuation stroke.

In such a configuration, when pressing down the ceiling wall of the airbag cover to actuate the horn, the ceiling wall is supported on the upper surface of the folded body having the shape retaining property, and the folded body itself supports the part around the housing recess on the bag holder via the peripheral edge of the inflow opening. Thus, it is possible to immediately move the bag holder downward, by the depressing amount of the ceiling wall. Further, if the depressing amount of the ceiling wall is equivalent to the actuation stroke, the bag holder is moved downward by the actuation stroke, and the horn switch mechanism is operated to actuate the horn. Therefore, in the airbag device according to the invention, the depressing amount of the ceiling wall during operation of the horn switch mechanism can be made to equal to the actuation stroke of the horn switch mechanism, and it is possible to operate the horn switch mechanism with improved tactility.

In the method of manufacturing the airbag device according to the invention, after passing through the folding process of folding the airbag, the folded body is preferably manufactured by being shaped in the folded shape capable of being housed between the airbag cover and the bag holder via the compression process of being compression-molded by the molding die equipped with the housing protrusion capable of forming the housing recess.

In such a configuration, as compared to the case of shaping the housing recess of the folded body using a sewing or adhesive, it is possible to form the housing recess by reducing the number of manufacturing processes, and it is possible to easily obtain the folded shape having the durability by having the housing recess of a predetermined shape.

By simply changing the housing protrusion of the mold die or the part in which the housing protrusion is provided, it is possible to change the shape of the housing recess, and it is possible to easily cope with a change in volume of the airbag itself, without adjusting the airbag cover and the inflator.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
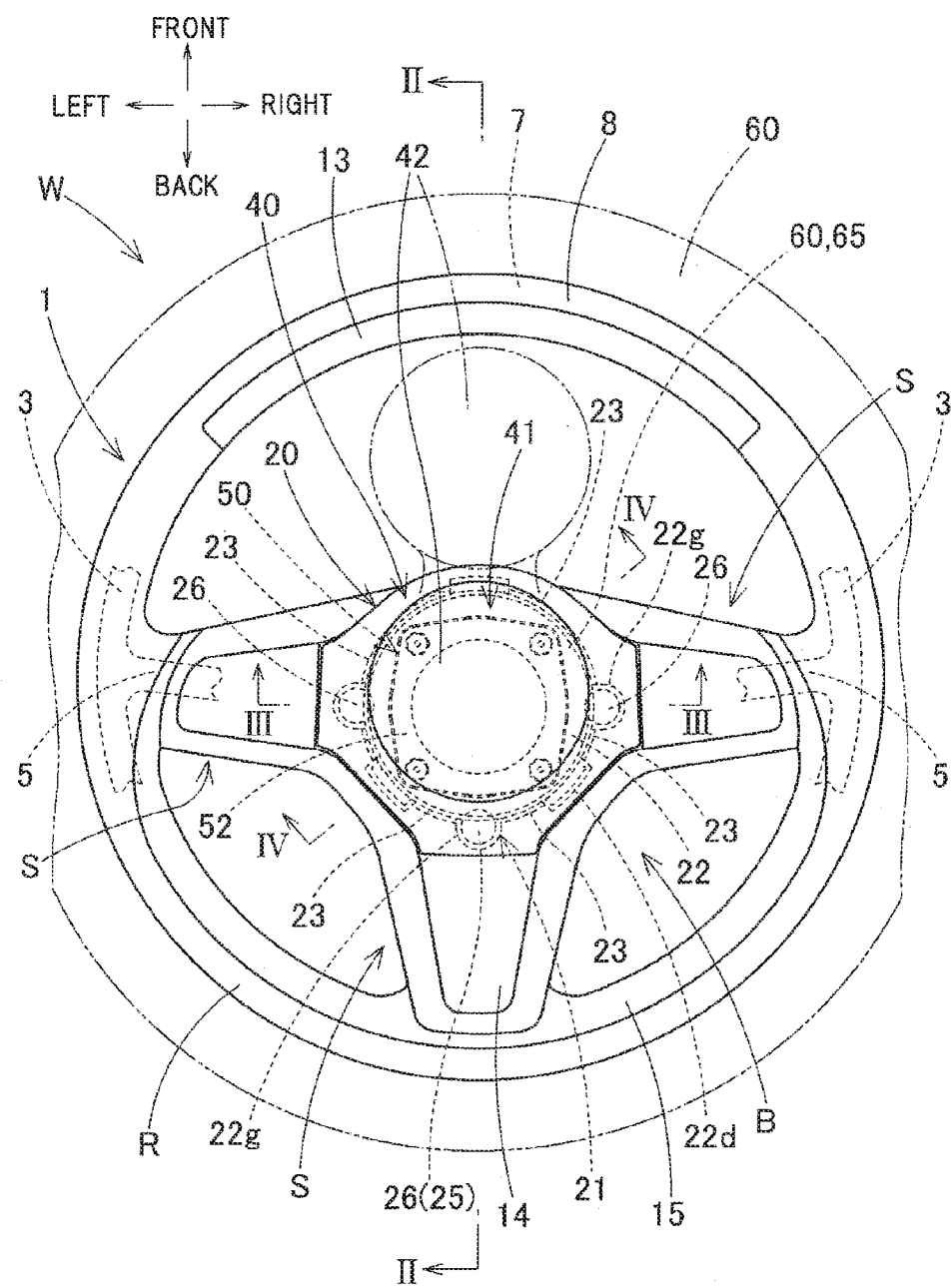
FIG. 1 is a schematic plan view of a steering wheel equipped with an airbag device of an embodiment of the invention.
Figure 2:
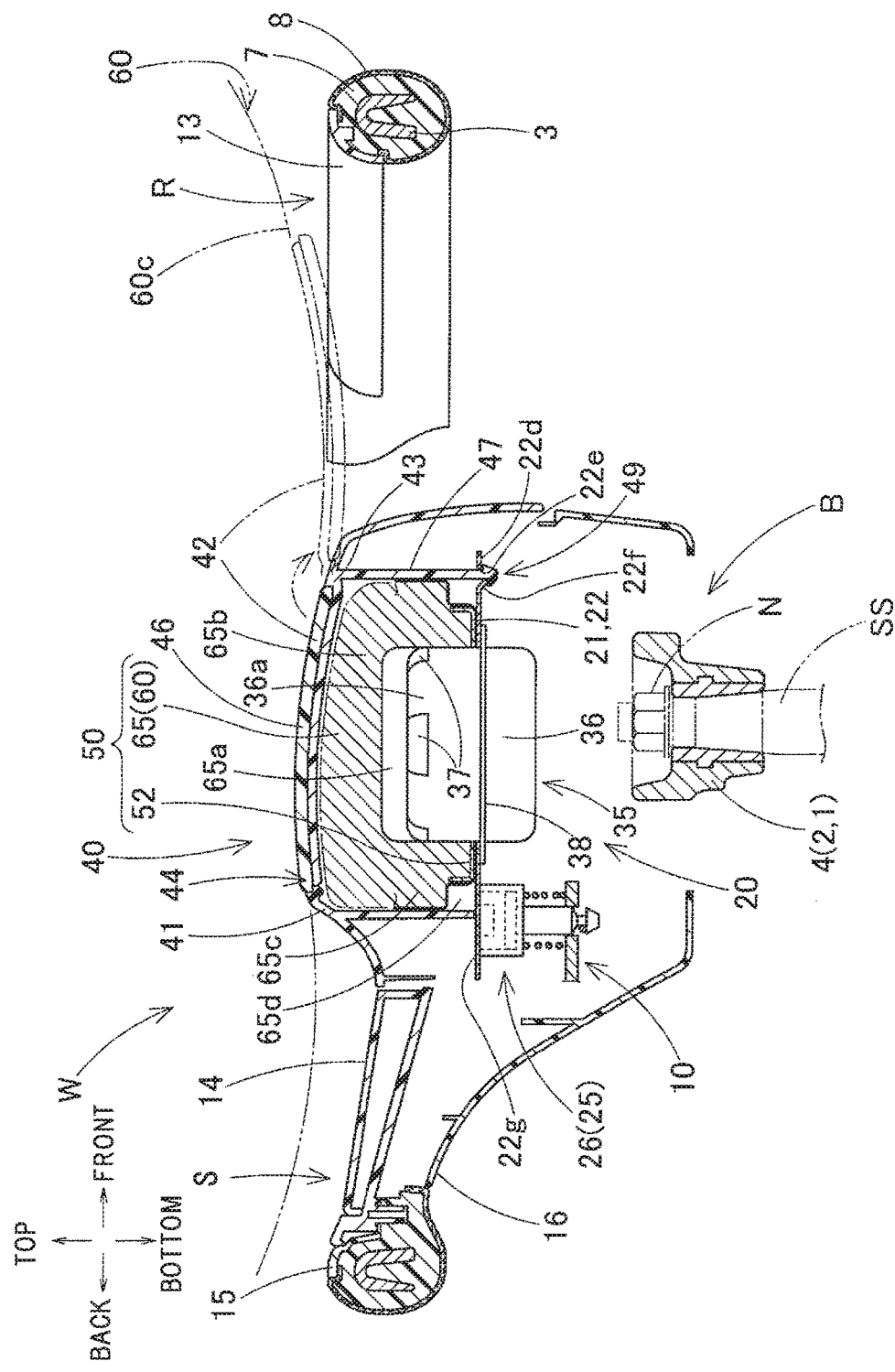
FIG. 2 is a schematic vertical sectional view of the steering wheel of the embodiment, corresponding to a part II-II of FIG. 1.

Hereinafter, an embodiment of the invention will be described with reference to the drawings. As illustrated in FIGS. 1 to 4, an airbag device 20 of the embodiment is an airbag device for a driver's seat that is mounted on a boss B of a steering wheel W. As illustrated in FIGS. 1 and 2, the steering wheel W is configured to include a ring R that is gripped when steering, a boss B disposed at the center of the ring R, a steering wheel body 1 having a spoke S connecting the ring R and the boss B, and an airbag device 20 disposed above the boss B.

Further, vertical, horizontal and longitudinal directions of the airbag device 20 of the present specification are based on the straight steering of the vehicle in a state of connecting the steering wheel W to a vehicle steering shaft SS (see FIG. 2) by a locking nut N. The vertical direction corresponds to a vertical direction extending along an axial direction of the steering shaft SS, the horizontal direction corresponds to a horizontal direction of the vehicle in a direction orthogonal to the axis of the steering shaft SS, and the longitudinal direction corresponds to a longitudinal direction of the vehicle in a direction orthogonal to the axis of the steering shaft SS (see FIGS. 1 and 2).

The steering wheel body 1 is configured to include a core metal 2 disposed to connect the ring R, the boss B and the spoke S to one another, and a coating layer 7 made of urethane or the like that covers the ring R and the site of the core metal 2 of the spoke S near the ring R. A leather 8 is wound around the surface of the coating layer 7. Further, decorative garnishes 13 and 15 are disposed on the inner peripheral side of the front and rear of the ring R.

The core metal 2 is configured to include a ring core metal 3 disposed in the ring R, a boss core metal 4 disposed on the boss B and connected to the steering shaft SS, and a spoke core metal 5 disposed on the left and right spokes S to couple the ring core metal 3 and the boss core metal 4. In the embodiment, the spoke core metal 5 is disposed only at the site of the front left and right two spokes S, and in the spoke S of the rear side, a bezel 14 surrounding the periphery of an airbag cover (pad) 40 to be described later is disposed.

At the peripheral edge of the boss core metal 4 of the core metal 2, a fixing unit 10 for fixing each assembling pin 29 of a horn switch mechanism 25 to be described later of the airbag device 20 is disposed (see FIGS. 2 and 3). The fixing unit 10 is configured by disposing a locking hole 11 penetrating in a shape of a narrowing-down taper, and a locking pin 12 that is disposed on the lower surface side of the boss core metal 4 to lock a locking head 31 of the assembling pin 20. The locking pin 12 is formed of a spring material that is restorable and deflectable along the lower surface of the boss core metal 4.

Figure 4:
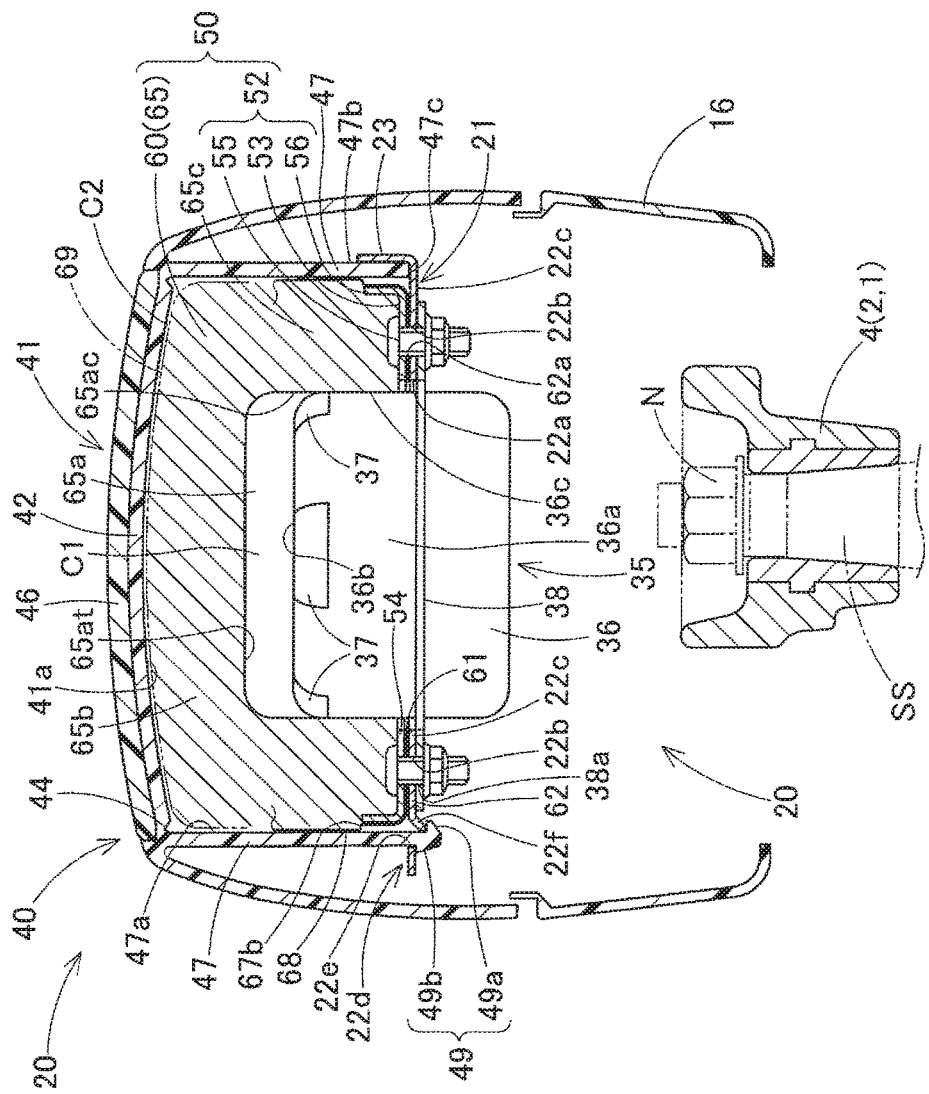
FIG. 4 is a schematic vertical sectional view of the steering wheel of the embodiment, corresponding to a part IV-IV of FIG. 1.
Figure 5A:
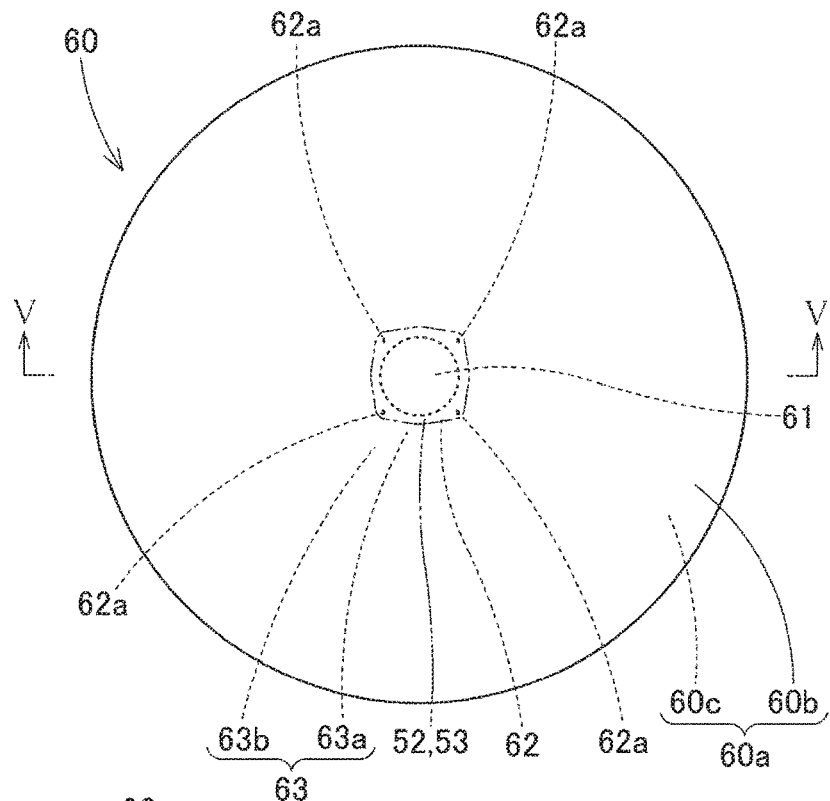
FIGS. 5A and 5B are schematic plan view and a schematic cross-sectional view illustrating an inflated state of an airbag as a single unit of the embodiment.
Figure 5B:
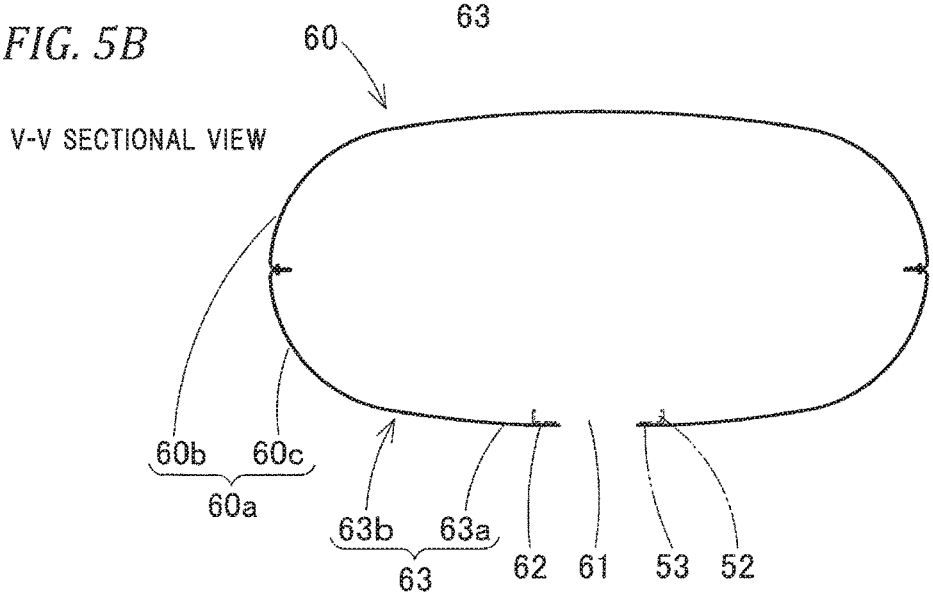

The steering wheel body 1 is configured by disposing the lower cover 16 on the lower surface of the boss B (see FIGS. 2 and 4).

As illustrated in FIGS. 1 to 4, the airbag device 20 is configured to include a folded body 65 provided by folding the airbag 60, an inflator 35 for supplying an inflation gas to the airbag 60, an airbag cover (pad) 40 made of synthetic resin disposed on the upper surface side of the boss B to cover the folded body 65, and a bag holder 21 made of sheet metal for holding the folded body 65 (the airbag 60). The bag holder 21 is a portion for attaching and fixing the folded body 65, and for holding the inflator 35 and the airbag cover 40.

In the case of the embodiment, in the folded body 65 provided by folding the airbag 60, on the inside of the lower surface 66 side, a retainer 52 for attaching and fixing the airbag 60 to the bag holder 21 is provided (FIGS. 2 to 4, and 6 to 9). Further, the airbag 60 is folded and is further compression-molded while assembling the retainer 52. Therefore, when the folded body 65 of the airbag 60 is compression-molded and is shaped into a predetermined folded shape, a state (completely folded body 50) in which the retainer 52 is assembled to the folded body 65 of the airbag 60 is obtained, and as the state of completely folded body 50 having the retainer 52 and the folded body 65 of the airbag 60, the folded body is attached and fixed to the bag holder 21.

As illustrated by two-dot chain line in FIGS. 1 and 2 and FIGS. 5A and 5B, the airbag 60 has as a completely inflated shape of a substantially circular plate shape with a thickness approximate to the spherical shape, an inflow opening 61 (see FIGS. 3 to 5B) which opens in a circular form to introduce the inflation gas to the lower side, and at the peripheral edge 62 of the inflow opening 61, four through-holes 62a through which the bolt 55 as the fixing means of the retainer 52 pass are formed. The peripheral wall 60a of the airbag 60 is formed by sewing outer peripheral edges of a driver-side panel 60b and a vehicle body side panel 60c having circular outer shape. The inflow opening 61 is provided at the center of the vehicle body side panel 60c. Further, the peripheral edge 62 of the inflow opening 61 forms an attachment portion that is pressed by the retainer 52 to attach the airbag 60 to the bag holder 21. The attachment portion 62 is a part of a substantially rectangular annular shape in which a lower surface side thereof abuts against a lower surface 53c of a bottom wall 53 (to be described later) of the retainer 52, and the lower surface serves as a bottom wall cover 66a (to be described later) of the folded body 65 provided by folding the airbag 60.

A reinforcing fabric (not illustrated) for increasing the strength is disposed in the attachment portion 62 and the portion 63 in the vicinity thereof, and is formed in a sheet shape of a single sheet shape with the vehicle body side panel 60c.

As illustrated in FIGS. 1 to 6 and 9, the retainer 52 is formed from sheet metal having, in the center, a square annular bottom wall 53 having a communication opening 54 which opens in correspondence with the inflow opening 61, and a reinforcing rib 56 that is disposed to rise from the entire circumference of the outer peripheral edge of the bottom wall 53. The reinforcing ribs 56 are disposed to improve the flexural rigidity of the bottom wall 53. The communication opening 54 has a circular opening with the same shape as the inflow opening 61. The retainer 52 is provided with a plurality of bolts 55 as fixing means that protrude downward from the bottom wall 53 around the communication opening 54 centered on the communication opening 54 to fix the attachment portion 62 of the airbag 60 to the bag holder 21. Each bolt 55 is provided to protrude downward from the vicinity of the corner 53a of the four corners of the square annular bottom wall 53. Further, the retainer 52 is disposed in the periphery (attachment portion) 62 of the inflow opening 61 in the airbag 60 to allow each bolt 55 to sequentially pass through the through-hole 62a of the airbag 60, a through-hole 22b of the bag holder 21 to be described later and a through-hole 38a of the flange 38 of the inflator 35 to be described later, and tightens nuts to the bolts 55, thereby attaching the airbag 60 and the inflator 35 to the bag holder 21.

Figure 10:
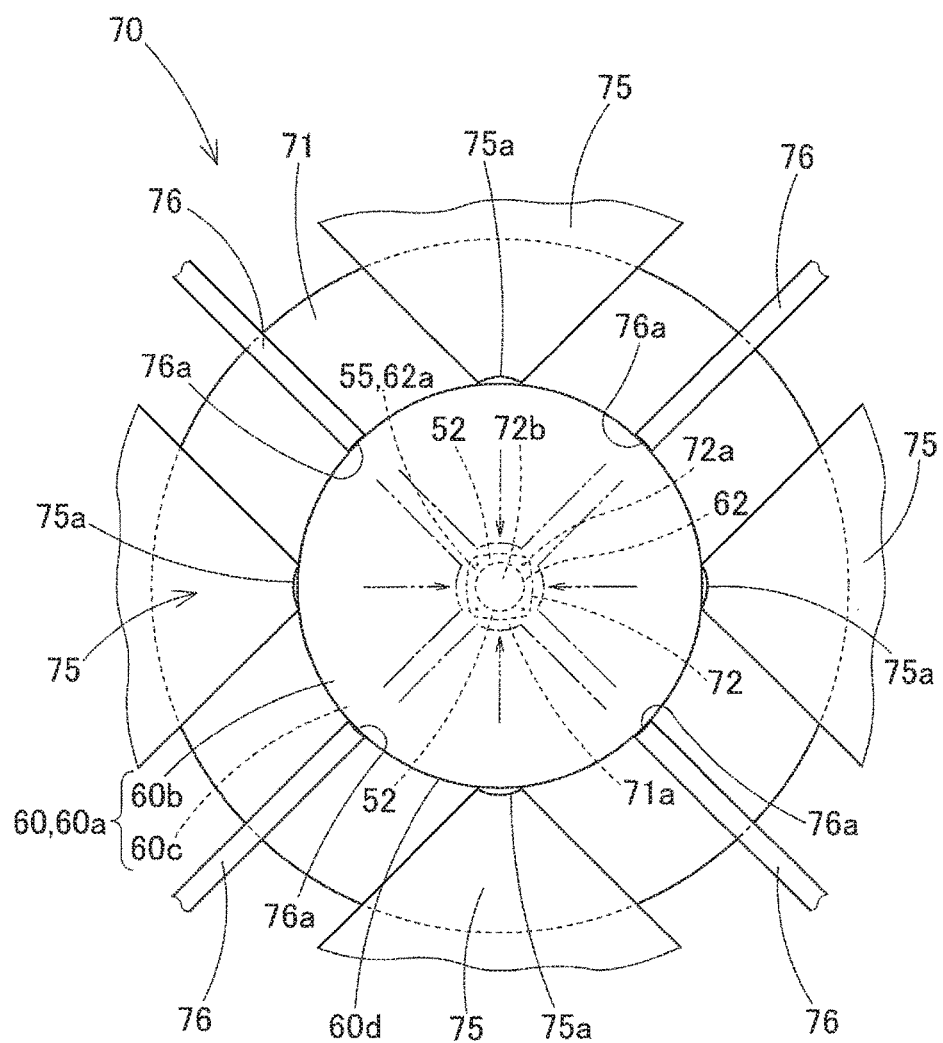
FIG. 10 is a schematic plan view illustrating a bag folding machine that is used in a folding process of the airbag of the embodiment.
Figure 12:
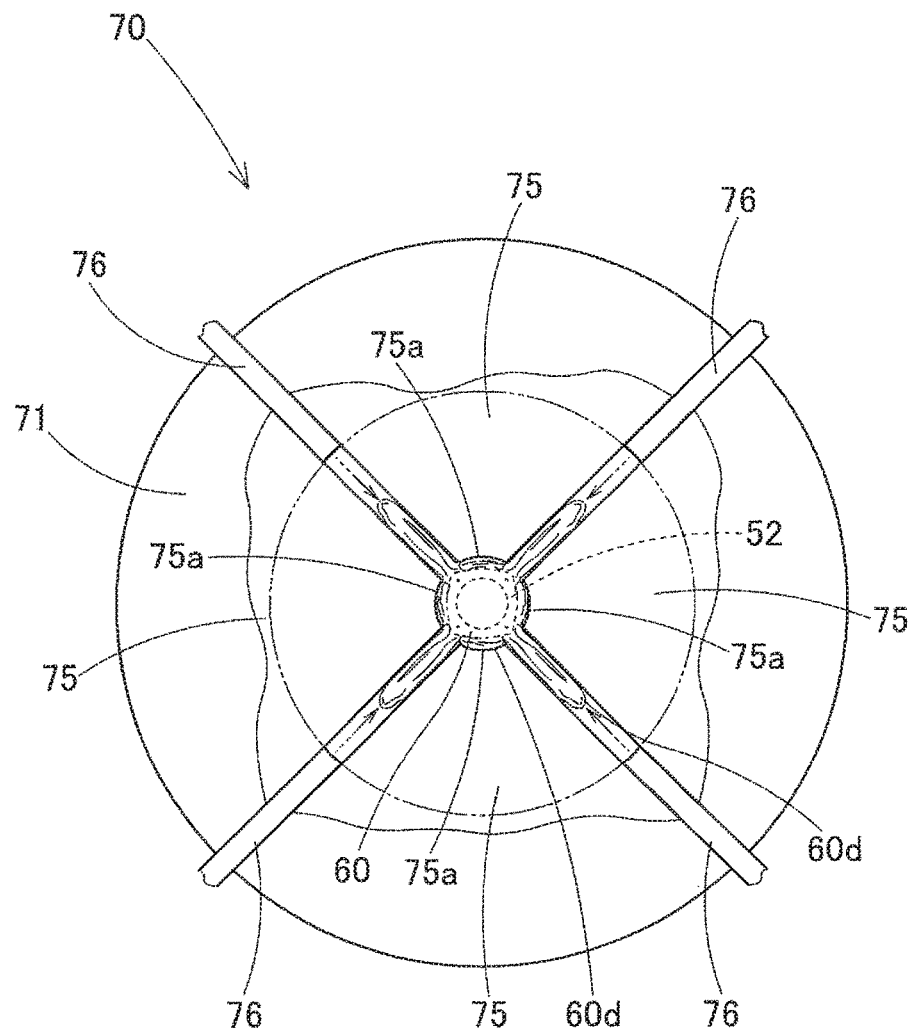
FIG. 12 is a diagram illustrating the folding process of the airbag of the embodiment.
Figure 13:
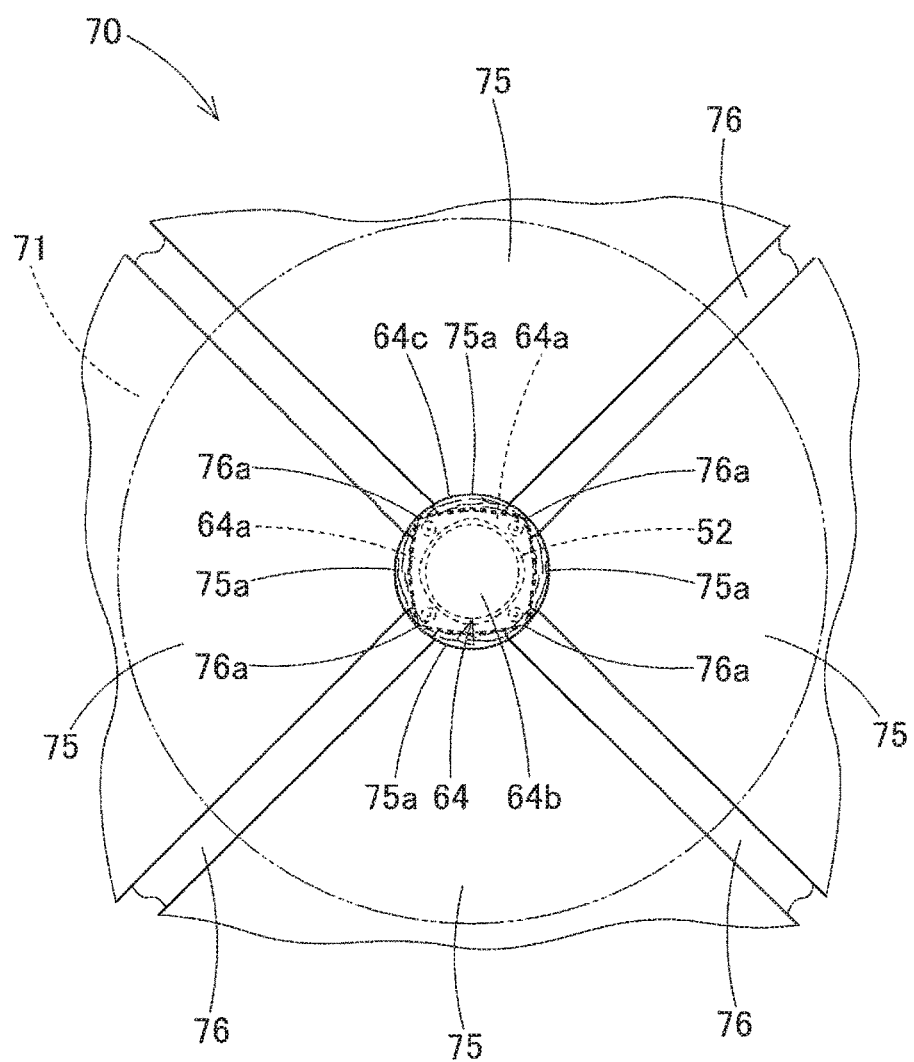
FIG. 13 is a diagram illustrating the folding process of the airbag of the embodiment, and illustrating a subsequent process of FIG. 12.

In the manufacturing process of completely folded body 50 including the folded body 65 and the retainer 52, first, as illustrated in FIG. 10, respective bolts 55 are made to protrude from the through-holes 62a, the retainer 52 is disposed in the attachment portion 62 of the airbag 60, then the driver's side panel 60b overlaps on the vehicle body side panel 60c, the airbag 60a is set to a bag folding machine 70 used in the folding process of the airbag 60 in a flattened state, and, as illustrated in FIGS. 12 and 13, the outer peripheral edge 60d of the airbag 60 is collected on the upper side of the retainer 52, and a preliminary folded body 64 provided by folding the airbag 60 is formed on the upper side of the bottom wall 53 of the retainer 52. Furthermore, as illustrated in FIGS. 14 to 17, when a housing recess 65a is provided using bag molding machines 80 and 90 used for the compression process of the airbag 60, and the compression working to maintain the folded shape is performed, the completely folded body 50 (folded body 65) of an approximately columnar shape is manufactured. Further, the folded body 65 of the completely folded body 50 has a shape retaining property that is capable of supporting the ceiling wall 41 of the airbag cover 40. Specifically, although the folded body 65 has the lower rigidity than the bag holder 21 and the retainer 52 made of a sheet metal, it has the shape retaining property with the rigidity higher than the airbag cover 40, even if it is diagonally tilted, is turned upside down or is partially pressed, is not folding collapsed, and is not easily recessed, and has rigidity to the extent of keeping a substantially columnar outer shape. Of course, the folded body 65 has the shape retaining property to the extent that allows deployment and inflation of the airbag 60 during inflow of the inflation gas.

As illustrated in FIGS. 6 to 9, the folded body 65 has a substantially columnar shape having a housing recess 65a provided on the lower surface 66 side, and is configured to include a substantially disk-shaped upper wall 65b of the upper surface 69 side that closes the top of the housing recess 65a, and a substantially cylindrical side wall 65c that extends downward to surround the housing recess 65a from the upper wall 65b. The housing recess 65a is formed to be recessed upward from the center of the lower surface 66 of the folded body 65. The housing recess 65a is configured to include an inner circumferential surface 65ac extending upward in a cylindrical shape to have an inner diameter substantially equal to the communication opening 54 of the retainer 52, and a substantially circular ceiling surface 65at disposed at the upper end of the inner circumferential surface 65ac. The housing recess 65a is formed to be able to house a top 36a of the main body unit 36 to be described later of the inflator 35. However, in the case of the embodiment, it is configured so that a clearance C1 is formed between the ceiling surface 65at and the upper surface 36b of the top 36a of the inflator 35 in a state in which the inflator 35 is attached and fixed to the bag holder 21 (see FIG. 3), in particular, in the case of the embodiment, the clearance C1 is formed over the entire region between the ceiling surface 65at and the upper surface 36b of the top 36a of the inflator 35, without having a mutual contact location.

Figure 3:
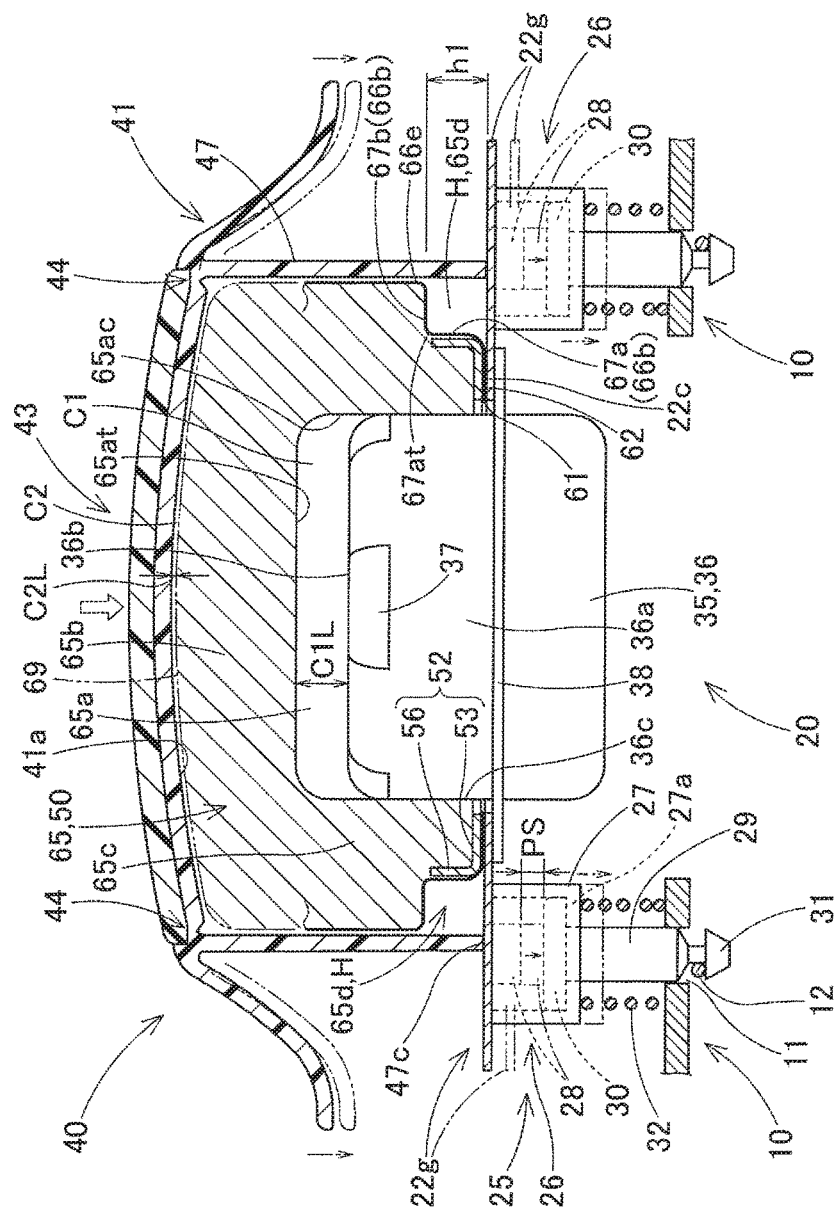
FIG. 3 is a schematic vertical sectional view of the steering wheel of the embodiment, corresponding to a part III-III of FIG. 1.

As illustrated in FIGS. 3 and 4, the upper surface 69 of the folded body 65 (upper skull 65b) is a curved surface corresponding to the lower surface 41a, by providing a small clearance C2 with respect to the lower surface 41a of the ceiling wall 41 of the airbag cover 40. Further, a clearance dimension C1L (see FIG. 3) of the clearance C1 between the housing recess 65a and the upper surface 36b of the inflator 35 is set to be larger than a clearance dimension C2L of the clearance C2 between the upper surface 69 and the lower surface 41a of the ceiling wall 41.

Further, on the lower surface 66 side of the folded body 65, the bottom wall 53 of the retainer 52 is disposed in the peripheral edge (attachment portion) 62 of the inflow opening 61 of the inner circumferential surface side of the airbag 60, while making the bolts 55 protrude to the through-holes 62a. Therefore, in a case where the folded body 65 having the shape retaining property is attached and fixed to the bag holder 21, the upper wall 65b side of the folded body 65 is supported to abut against the bag holder 21 via the side wall 65c in which the retainer 52 is equipped in the lower end side of the side wall 65c.

On the lower end side of the side wall 65c of the folded body 65, a recess 65d annularly recessed provided with a stepped surface 67 is formed. The recess 65d is formed to prevent a part of the peripheral wall 60a other than the site of the attachment portion 62 in the airbag 60 from being caught between the bag holder 21 and the retainer 52.

The lower surface 66 of the folded body 65 in the vicinity of the recess 65d is configured by disposing, with the exception of the site of the opening (inflow opening) 61 of the housing recess 65a, a bottom wall cover 66a disposed on the lower surface 53c side of the bottom wall 53 of the retainer 52, and a bottom wall separation part 66b that extends from the bottom wall cover 66a and is disposed around the bottom wall 53 of the retainer 52.

The site extending from the bottom wall cover 66a of the bottom wall separation part 66b constitutes a stepped surface 67. The stepped surface 67 is configured to include a vertical surface 67a of the stepped surface 67 that is bent upward from the bottom wall cover 66a, and a horizontal surface 67b of the stepped surface 67 that is located on the upper side of the bottom wall cover 66a and extends from the upper end 67at of the vertical surface 67a to the outer peripheral edge 66c side of the bottom wall separation part 66b. In the case of the embodiment, the horizontal surface 67b is configured so that the bottom wall 53 and the bottom wall cover 66a are parallel to each other.

The part of the airbag 60 constituting the bottom wall cover 66a is an attachment portion 62 that is a peripheral edge of the inflow opening 61 in the body side panel 60c of the airbag 60 (see FIGS. 5A to 7 and 9), the attachment portion 62 has a single sheet shape having no wrinkle or fold and is disposed in close contact with the lower surface 53c of the bottom wall 53 of the retainer 52, and the lower surface of the attachment portion 62 constitutes the bottom wall cover 66a.

Figure 6:
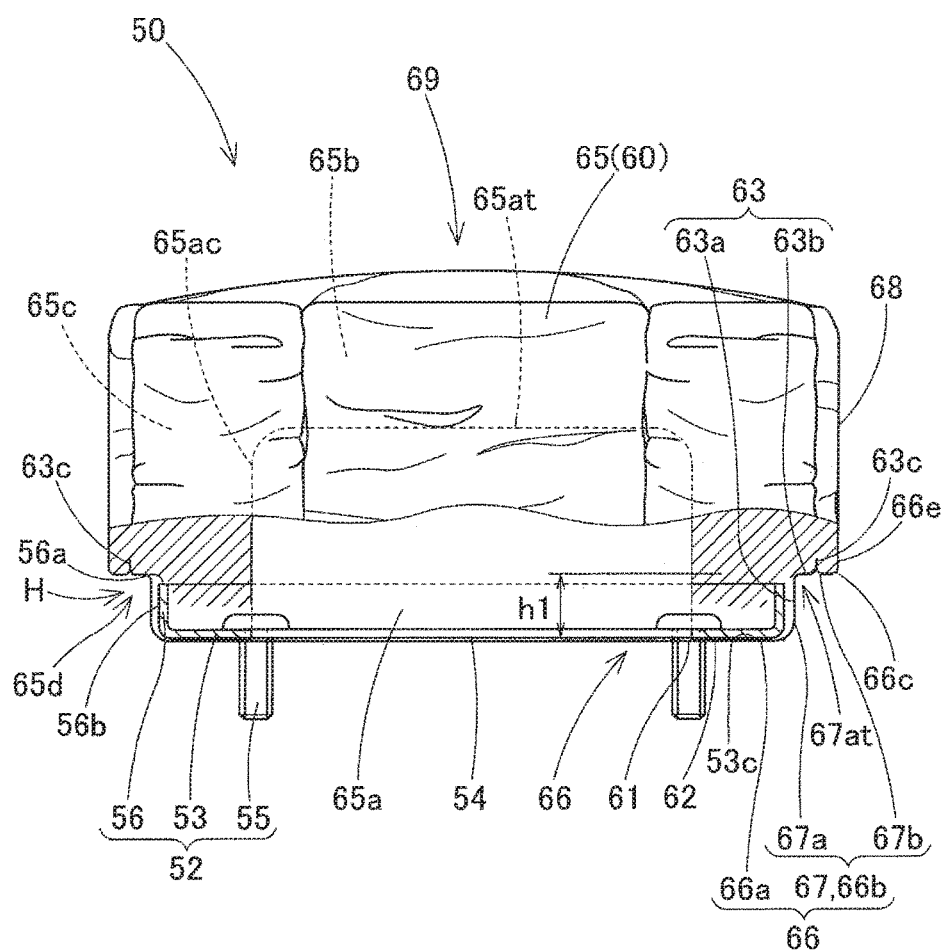
FIG. 6 is a schematic partial vertical sectional view of a folded body of a state of assembling a retainer of the embodiment.

The part of the airbag 60 constituting the bottom wall separation part 66b is a vicinity part 63 near the attachment portion 62 extending from the attachment portion 62 of the airbag 60 (see FIGS. 5A to 7 and 9), and the vertical surface 67a and the horizontal surface 67b are formed from the outer surface of the vicinity part 63. The part disposed so as to be in close contact with the outer surface (outer circumferential surface) 56b of the reinforcing rib 56 of the retainer 52 is configured to include an inner portion 63a of the vicinity part 63 continuous with the attachment portion 62, and the vertical surface 67a is formed from the outer surface. However, the horizontal surface 67b is configured from the lower surface side in which the vicinity part 63 is formed in a planar shape when viewed from four directions of the folded body 65 so as to make a height dimension h1 from the bottom wall cover 66a constant. However, in fact, the lower surface 66 side of the folded body 65 is configured to provide a crease portion 63c obtained by partially folding and overlapping in four directions the outer portion 63b around the inner portion 63a of the vicinity part 63 (see FIGS. 6 and 9). In the case of the embodiment, a clearance is illustrated in FIGS. 3, 4 and 6, however, in practice, the inner portion 63a of the vicinity part 63 continuous with the attachment portion 62 has a single sheet shape and is in close contact with the outer surface (outer circumferential surface) 56b of the reinforcing rib 56 of the retainer 52, with no wrinkles and folds.

In the case of the embodiment, the horizontal surface 67b of the stepped surface 67 is disposed at a high position slightly above the upper end surface 56a of the reinforcing rib 56 of the retainer 52. In addition, the horizontal surface 67b of the outer peripheral side of the reinforcing rib 56 of the corner 53a of the retainer 52 is disposed as a small area, (see FIGS. 4 and 9).

As illustrated in FIGS. 2 to 4, the inflator 35 includes a columnar main body unit 36, and a rectangular annular flange 38 protrudes from the outer circumferential surface 36c of the main body unit 36. The flange 38 is formed with a through-hole 38a through which the bolts 55 of the retainer 52 pass. At the top 36a side of the flange 38 of the main body unit 36, a plurality of gas discharge ports 37 for discharging the inflation gas are disposed. Further, as described above, the top 36a is a part that is inserted into the housing recess 65a of the completely folded body (folded body 65) 50, via the communication opening 54 of the retainer 52 and the inflow opening 61 of the airbag 60, when the completely folded body 50 including the retainer 52 and the folded body 65 or the inflator 35 is fixed to the bag holder 21.

As illustrated in FIGS. 1 to 4, the airbag cover 40 is made of a synthetic resin such as olefin-thermoplastic elastomer (TPO), and is disposed on the upper surface side of the boss B near the center of the steering wheel W. The airbag cover 40 is configured to include a ceiling wall 41 for covering the top of the completely folded body 50 folded and housed inside the boss B, and a side wall 47 that extends in a substantially cylindrical shape from the lower surface 41a of the ceiling wall 41 and covers the side surface (outer circumferential surface) 68 of the substantially columnar completely folded body 50 (folded body 65).

A disk-shaped door 42 that opens to the front side by being pushed by the airbag 60 to be inflated is disposed on the ceiling wall 41. The door 42 is configured by providing a hinge 43 on the front edge side and by providing a thin breakage scheduled part 44 with a substantially circular arc shape when viewed from the top, at the periphery.

In the case of the embodiment, a substantially disk-shaped ornament 46 made of a synthetic resin is fixed to the upper surface side of the door 42. When the door 42 is opened, the ornament 46 rotates integrally with the door 42.

As illustrated in FIGS. 1 and 4, on the side wall 47 of the airbag cover 40, locking legs 49 coupled to the bag holder 1 are disposed at three positions of the front side and the left and right oblique rear sides. Each locking leg 49 protrudes to extend downward from the lower end surface 47c of the side wall 47, is inserted through the locking hole 22e in the bag holder 21 and is locked to the peripheral edge of the locking hole 22e. The locking leg 49 is configured to include an inner protrusion 49a that protrudes to the inner circumferential surface 47a of the side wall 47, and an outer protrusion 49b that protrudes to the outer circumferential surface 47b side of the side wall 47. The inner protrusion 49a is locked by a tongue piece 22f that is bent and deformed after insertion into the locking hole 22e of the locking leg 49, the locking leg 49 is pushed by the tongue piece 22f, the outer protrusion 49b is locked at the peripheral edge of the outer edge side away from the inflator 35 of the locking holes 22e, and thus, the airbag cover 40 is locked while regulating the detachment upward with respect to the bag holder 21.

Since the side wall 47 is configured to make the lower end surface 47c between the locking legs 49 and 49 abut against the base plate 22 of the bag holder 21, and the upward movement from the bag holder 21 is restricted by the locking leg 49, the airbag cover 40 is attached and fixed to the bag holder 21, while regulating the vertical movement and longitudinal and lateral movements.

As illustrated in FIGS. 1 to 4, the bag holder 21 is made of a sheet metal, and is configured as a me giber made of a sheet metal that holds the completely folded body 50 (folded body 65), the inflator 35 and the airbag cover 40, and attaches the airbag device 20 to the steering wheel body 1, by utilizing the switch unit 26. The bag holder 21 is configured to include a substantially annular base plate 22, and a side wall support part 23 that protrudes upward from the outer peripheral edge of the base plate 22.

On the front side and the left and right oblique rear sides of the base plate 22, a locking portion 22d configured to pass through the locking hole 22e provided with the tongue piece 22f is disposed, and on the rear side and the left and right sides, substantially semicircular-plate shaped switch support units 22g for fixing the respective switch units 26 are disposed. The side wall support unit 23 is disposed on the outer circumferential surface 47b side of the side wall 47 of the airbag cover 40 between the locking portion 22d and the switch support unit 22g to restrict the swelling deformation of the sidewall 47 at the time of inflation of the airbag 60.

At the center of the base plate 22, in correspondence with the inflow opening 61 of the airbag 60, the substantially circular insertion hole 22a opens into which the main body unit 36 of the inflator 35 is insertable from the bottom, and at the peripheral edge of the insertion hole 22a, four through-holes 22b through which the respective bolts 55 of the retainer 52 pass are formed. The part in which the through-hole 22b in the periphery of the insertion hole 22a is provided serves as an attachment seat 22c for attaching the folded body 65 and the inflator 35, using the retainer 52.

The three switch units 26 disposed in the switch support unit 22g constitute a horn switch mechanism (horn switch) 25 of the steering wheel W, and as illustrated in FIGS. 2 and 3, the switches are configured to include a substantially cylindrical cover 27, a movable side contact portion 28, an assembling pin 29 and a coil spring 32. Also, the cover 27 and the movable side contact portion 28 are disposed in the switch support unit 22g of the bag holder 21, and the coil spring 32 is disposed between the fixing unit 10 of the core metal 2 and the cover 27 to bias the cover 27 upward. The assembling pin 29 disposes the fixing side contact portion 30 in the cover 27 so as to face the movable side contact portion 28 in the vertical direction, and locks a locking head 31 of the lower end side against the locking pin 12 disposed in the locking hole 11. The fixing side contact portion 30 abuts on the upper surface of the bottom wall 27a of the cover 27 to prevent detachment downward from the cover 27. Further, the detachment of the assembling pin 29 upward from the locking hole 11 is restricted by the locking pin 12, and since the downward movement of the fixing side contact portion 30 is restricted by the bottom wall 27a of the cover 27 which is biased upward by the coil spring 32, the assembling pin is disposed to be fixed to the fixing unit 10 of the core metal 2 while its vertical movement is restricted.

The movable side contact portion 28 is electrically connected to a positive electrode side of a horn actuating circuit connected to the base plate 22, and the fixing side contact portion 30 is electrically connected to the core metal 2 side as an anode side of the horn actuating circuit, by interposing the locking head 31 and the locking pin 12. Therefore, if the airbag cover (pad) 40 is lowered for each airbag device 20 by the actuation stroke (the separation distance between the contact portions 28 and 30) PS, each switch unit 26 of the horn switch mechanism 25 lowers the movable side contact portion 28, with the base plate 22 of the bag holder 21 to bring the movable side contact portion 28 into contact with the fixing side contact portion 30, thereby actuating the horn.

Specifically, when pressing down the vicinity of the center of the ceiling wall 41 of the airbag cover 40, the ceiling wall 41 closes the clearance C2, and abuts against the upper surface 69 of the folded body 65 having the shape retaining property capable of supporting the ceiling wall 41, presses the folded body 65 downward, and the folded body 65 moving downward lowers the bag holder 21 which is in contact with the lower surface (bottom surface) 66 of the side wall 65c. Therefore, the bag holder 21 and the base plate 22 lower the movable side contact portion 28 of each switch unit 26 to bring the movable side contact portion 28 into contact with the fixing side contact portion 30, thereby actuating the horn.

A process of forming the folded body 65 of the airbag 60 (the completely folded body 50) will be described. In the embodiment, a substantially columnar folded body 65 (completely folded body 50) provided with the housing recess 65a and the recess 65d is formed, by a folding process of forming the preliminary folded body 64 provided by folding the airbag 60 using the bag folding machine 70 illustrated in FIGS. 10 to 13, and a compression process of compressing and molding the preliminary folded body 64 subjected to the folding process, using the bag molding machines 80 and 90 illustrated in FIGS. 14 to 17.

As illustrated in FIGS. 10 to 13, the bag folding machine 70 is configured to include a substrate 71, a ceiling wall 73 which is disposed to be vertically movable above the substrate 71, and two types of four pushing members 75 and 76 that move toward the center of the substrate 71 on the substrate 71. At the center of the upper surface of the substrate 71, a setting unit 72 having an assembling hole 72a for fitting each bolt 55 of the retainer 52 protruding from the airbag 60 is disposed. The part of the setting unit 72 on the upper surface side of the substrate 71 serves as a molding surface 71a that forms the lower surface 66 side (bottom surface 64a of the preliminary folded body 64) before providing the housing recess 65a and the recess 65d of the folded body 65 of the airbag 60. Further, the vicinity of the center of the lower surface side of the ceiling wall 73 serves as a molding surface 73a that forms the upper surface 69 side (the planar ceiling surface 64b of the preliminary folded body 64) before providing the recesses 65a and 65d of the folded body 65. Further, a substantially columnar protrusion 72b is provided in the setting unit 72 so as to easily form the housing recess 65a for housing the top 36a of the inflator 35 in the folded body 65. Further, the setting unit 72 is configured to precisely hold the bolts 55 of the retainer 52 such that parts other than the attachment portion 62 of the airbag 60 do not enter the lower surface 53c side of the bottom wall 53 of the retainer 52, at the time of the folding process.

The pushing members 75 and 76 are disposed alternately in the circumferential direction around the setting unit 72, and on the surface of the setting unit 72 side, arcuate molding surfaces 75a and 76a for forming the outer circumferential surface 68 side (outer circumferential surface 64c of the preliminary folded body 64) before providing the recesses 65a and 65d of the folded body 65 are formed.

On the substrate 71 and the ceiling wall 73, a heater 78 as a heating means is disposed to heat the airbag 60 which was set to 50° C. or higher (about 50 to 90° C.). The heater 78 is also appropriately disposed on the pushing members 75 and 76.

Figure 11:
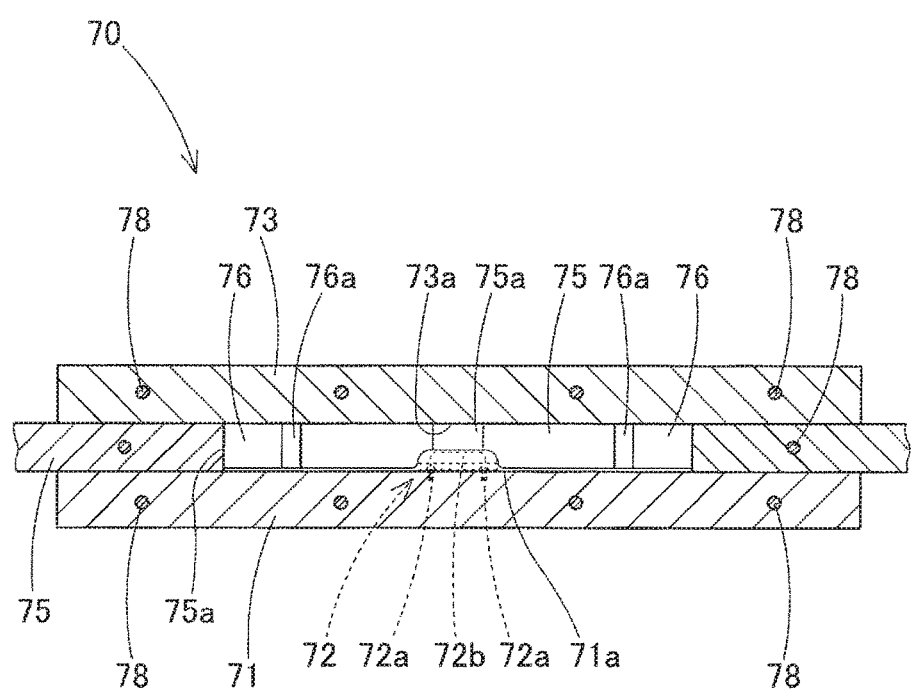
FIG. 11 is a schematic cross-sectional view of the bag folding machine that is used in the folding process of the airbag of the embodiment.

In the folding process of using the bag folding machine 70, in advance, the retainer 52 is disposed to in the attachment portion 62 in the airbag 60 to make the respective bolts 55 protrude from the through-holes 62a, and first, as illustrated in FIG. 10, a state is provided in which the bolts 55 are fitted to the assembling hole 72a of the setting unit 72, the driver's side panel 60b is superimposed on the vehicle body side panel 60c and the airbag 60 is flattened on the substrate 71, and then, the ceiling wall 73 is disposed at a position of a predetermined height form the substrate 71 so that the ceiling surface 64b of the preliminary folded body 64 can be formed (see FIG. 11). Then, as illustrated in FIG. 12, each pushing member 75 is moved to the setting unit 72 side, and the outer peripheral edge 60d of the airbag 60 is collected on the upper side of the retainer 52. Then, as illustrated in FIG. 13, each pushing member 76 is moved to the setting unit 72 side, and the remainder of the outer peripheral edge 60d of the airbag 60 is collected on the upper side of the retainer 52.

Then, the airbag 60 is folded to a substantially columnar preliminary folded body 64 prior to providing the housing recess 65a and the recess 65d, by the molding surface 71a of the upper surface side near the setting unit 72 of the substrate 71, the molding surface 73a near the center of the lower surface of the ceiling wall 73, and the molding surfaces 75a and 76a of the respective pushing members 75 and 76.

Figure 17:
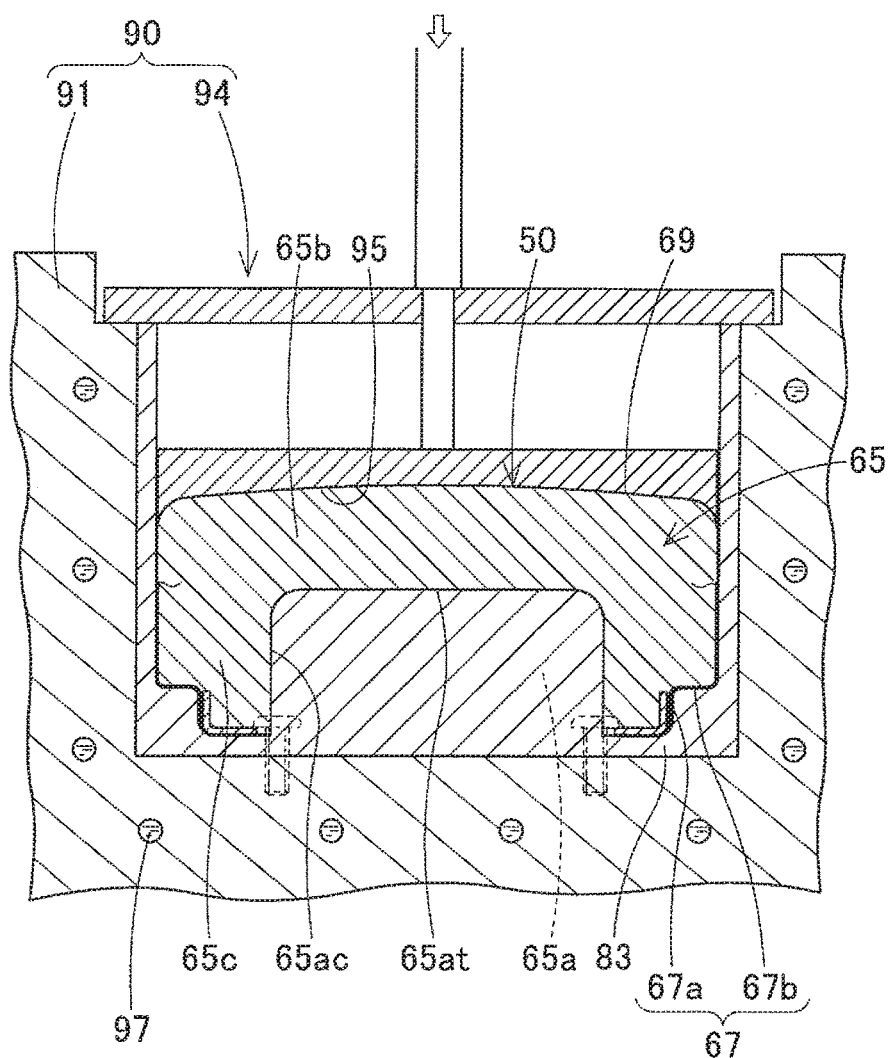
FIG. 17 is a diagram illustrating the compression process of forming the folded body of the embodiment, and illustrating a subsequent process of FIG. 16.
Figure 18:
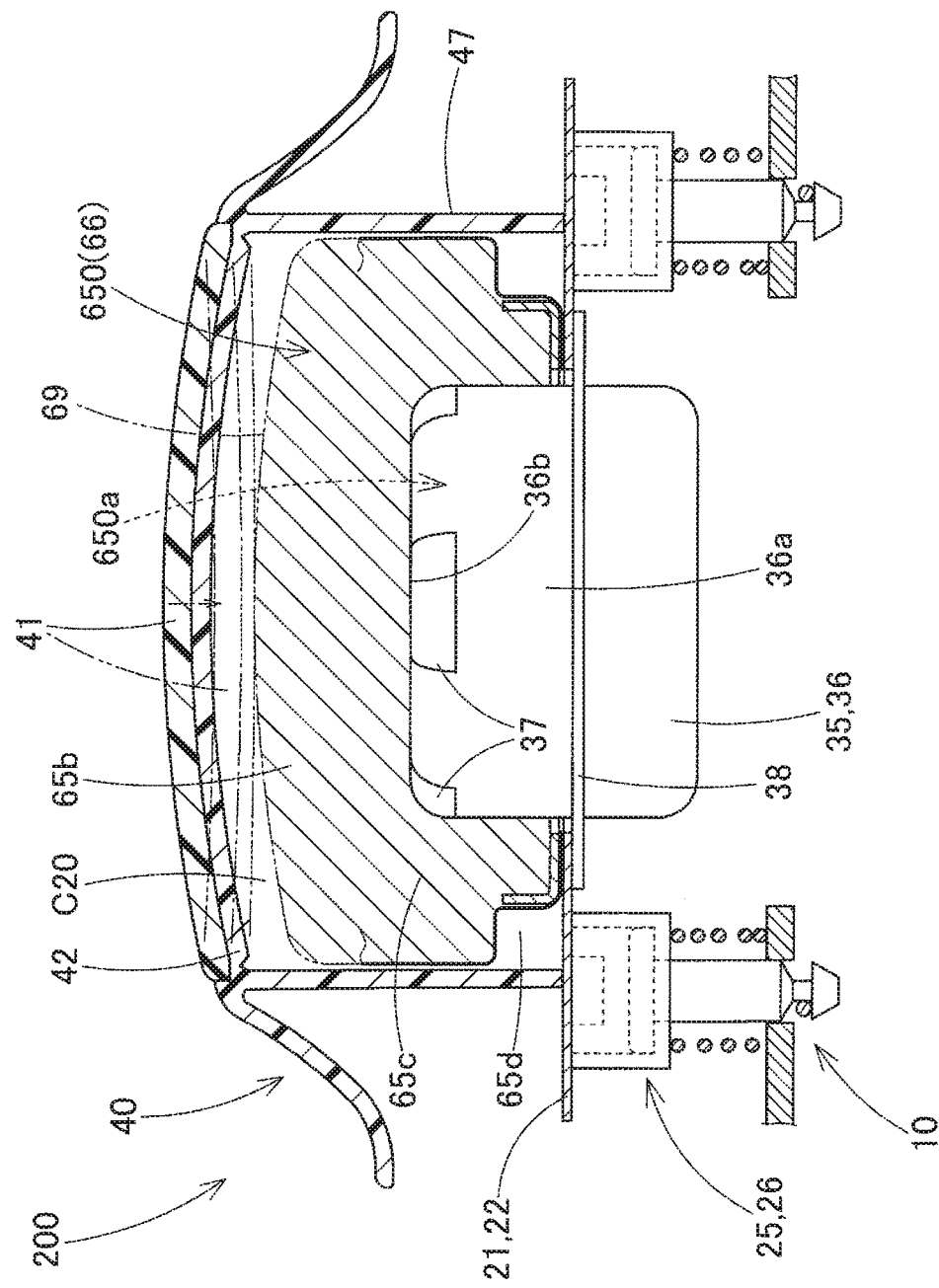
FIG. 18 is a schematic vertical sectional view illustrating an airbag device of a comparative example.

As illustrated in FIGS. 17 and 18, the bag molding machine 80 is intended to heat and compress the preliminary folded body 64 to form the folded body 65 on the upper side of the bottom wall 53 of the retainer 52, and is referred to as a bag heating compressor or a molder (heating and compression molding die). In the case of the embodiment, the bag heating compressor (the bag molding machine 80) is configured to include a molded body unit 81 having a setting unit 82 for housing a holding frame 83 made of a metal such as an iron with excellent thermal conduction, and a vertically movable pressing side unit 87.

The holding frame 83 is provided by providing a cylindrical side wall 83b above the outer peripheral edge of the substantially circular bottom wall 83a, and by providing a housing recess 83d to which the preliminary folded body 64 assembled with the retainer 52 is fitted on the inner side. Further, a assembling hole 84 through which each bolt 55 of the retainer 52 passes is provided on the bottom wall 83a, a housing protrusion 85 protruding in a substantially columnar shape capable of forming the housing recess 65a is disposed at the center, a substantially annular stepped protrusion 86 for forming the stepped surface 67 is disposed at the outer peripheral edge side, and the upper surface side of the bottom wall 83a is set as a molding surface 83at that shapes the lower surface 66 side of the folded body 65. The inner circumferential surface of the side wall 83b serves as a molding surface 83c that forms the outer circumferential surface 68 of the folded body 65.

In the setting unit 82 that houses the holding frame 83 of the molding main body unit 81, an assembling hole 82a capable of housing the bolts 55 of the retainer 52 is formed.

On the lower surface side of the pressing side unit 87, a pressing surface (molding surface) 88 which forms a curved upper surface 69 of the folded body 65 is formed.

In addition, in the molding main body unit 81 and the pressing side unit 87, a heater 89 as the heating means is disposed for each holding frame 83 so that the set preliminary folded body 64 can be heated to 100° C. or more (about 100 to 150° C.).

Figure 14:
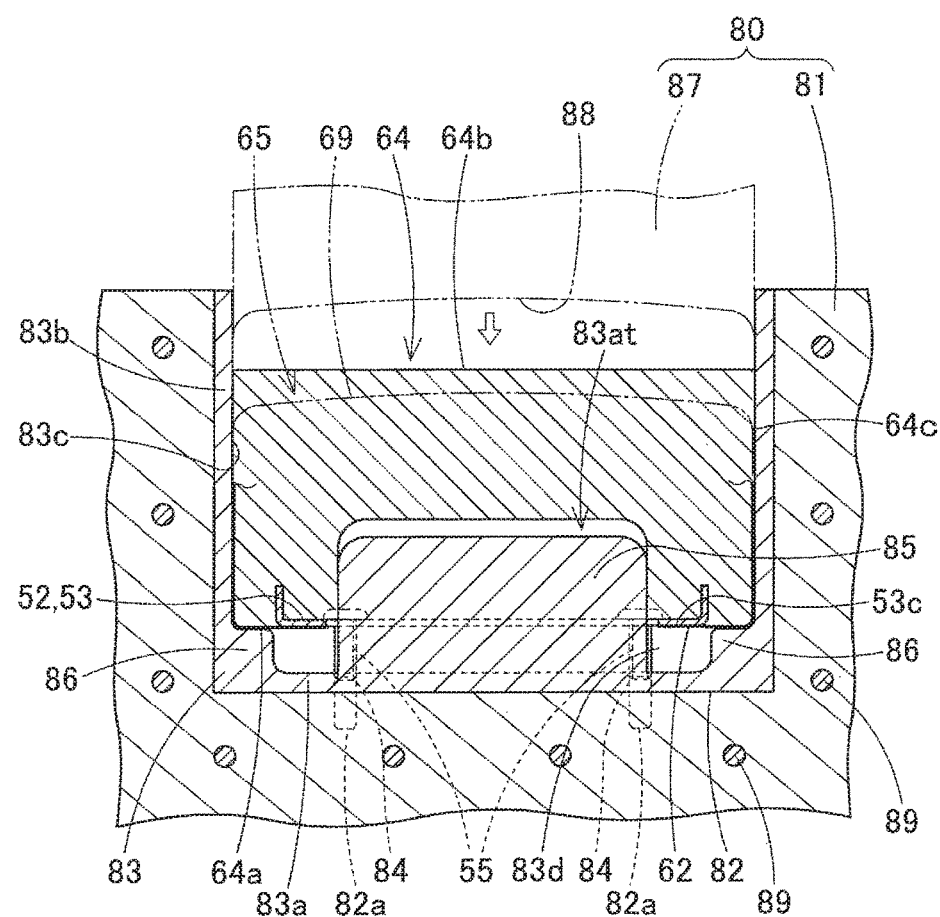
FIG. 14 is a diagram illustrating a compression process of forming the folded body of embodiment.
Figure 15:
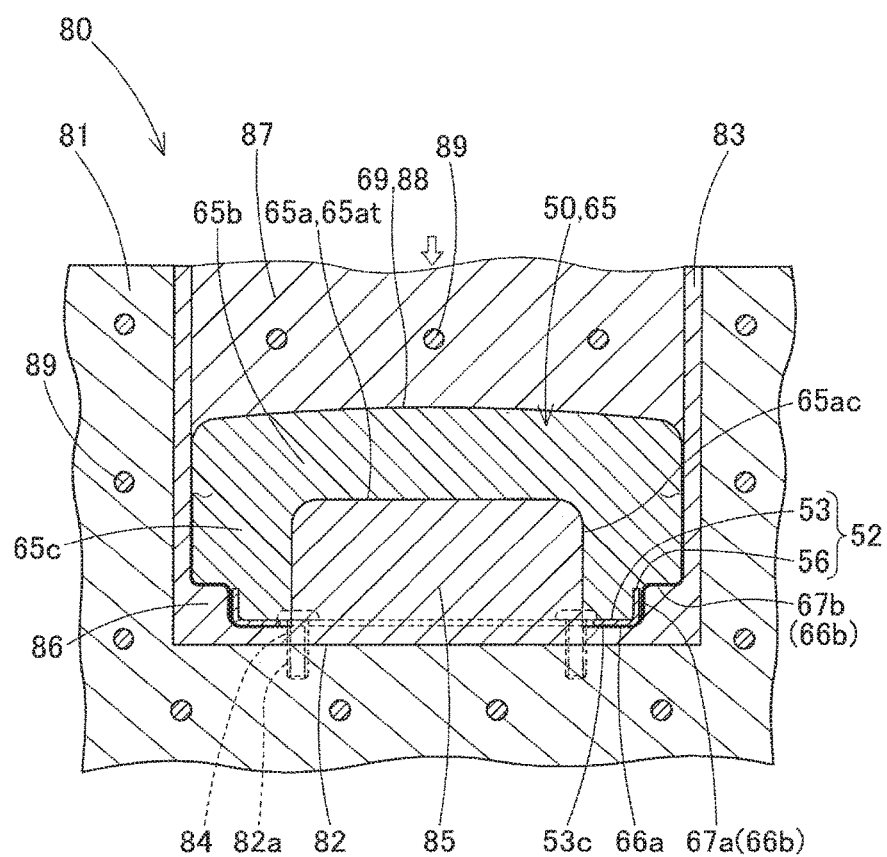
FIG. 15 is a diagram illustrating the compression process of forming the folded body of the embodiment, and illustrating a subsequent process of FIG. 14.

In the compression process using the bag heating compressor 80, first, as illustrated in FIG. 14, the preliminary folded body 64 is disposed on the bottom wall 83a so as to make each bolt 55 protrude from the assembling hole 84, the preliminary folded body 64 is housed in the holding frame 83, and the holding frame 83 is set on the setting unit 82 of the molded body unit 81. Then, as illustrated in FIG. 15, the pressing side unit 87 is inserted into the set holding frame 83, the preliminary folded body 64 is heated while compressing, and the heating compressed state is maintained approximately for 1 to 2 hours.

The molding main body unit 81 and the pressing side unit 87 may be heated from before setting the preliminary folded body 64 by the heater 89, and may be heated at the time of the compression start or during compression.

After a lapse of the predetermined time, the folded body 65 (completely folded body 50) formed in a predetermined folded shape by assembling the retainer 52 is formed in the holding frame 83.

However, in the case of the embodiment, the folded body 65 is finished, by performing a second compression molding that performs cooling, while maintaining the compressed state so that the folded shape has durability without collapsing over a long period of time, using the bag molding machine (bag cooling compressor and molding die (cooling and compression molding die)) 90.

Figure 16:
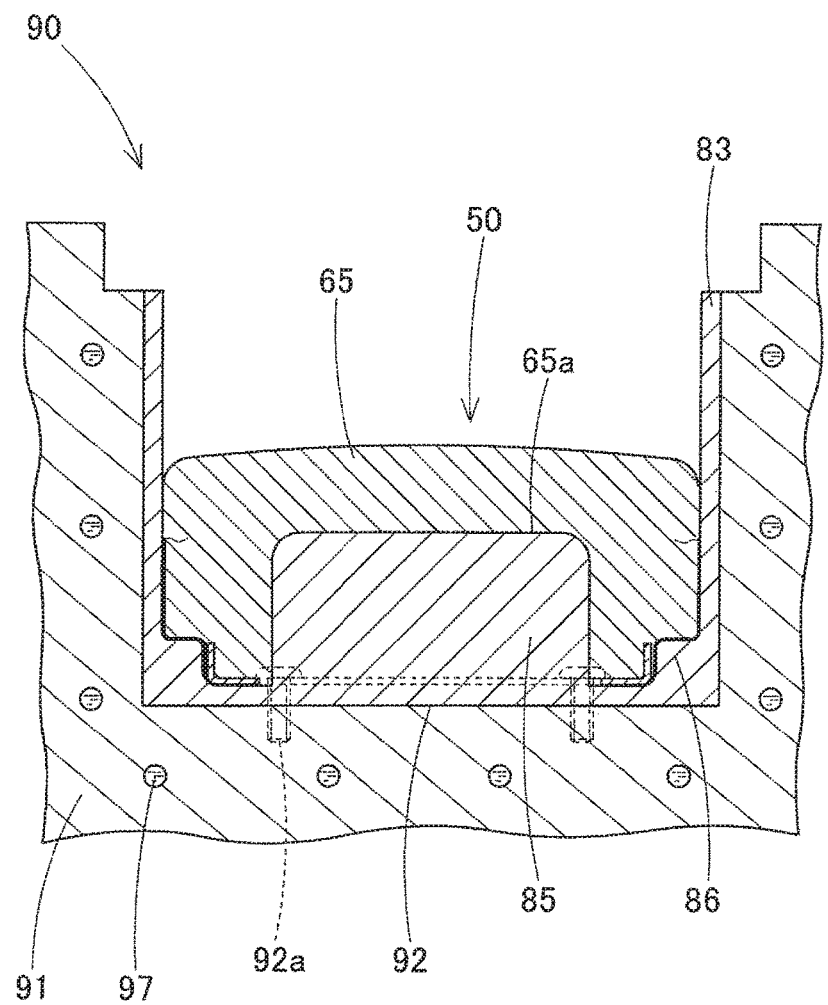
FIG. 16 is a diagram illustrating the compression process of forming the folded body of the embodiment, and illustrating a subsequent process of FIG. 15.

As illustrated in FIGS. 16 and 17, the bag cooling compressor 90 is configured to include a molding main body unit 91 having a setting unit 92 for housing the holding frame 83, and a vertically movable pressing side unit 94. The assembling holes 92a capable of housing the bolts 55 of the retainer 52 are formed in the setting unit 92 that houses the holding frame 83 of the molding main body unit 91. A pressing surface (molding surface) 95 which forms a curved upper surface 69 of the folded body 65 is disposed on the lower surface side of the pressing side unit 94.

In the molding main body unit 91, a cooling water passage 97 as a cooling means is disposed to allow the set completely folded body 50 to be cooled to 40° C. or less (about 5 to 40° C.) for each holding frame 83.

Figure 7:
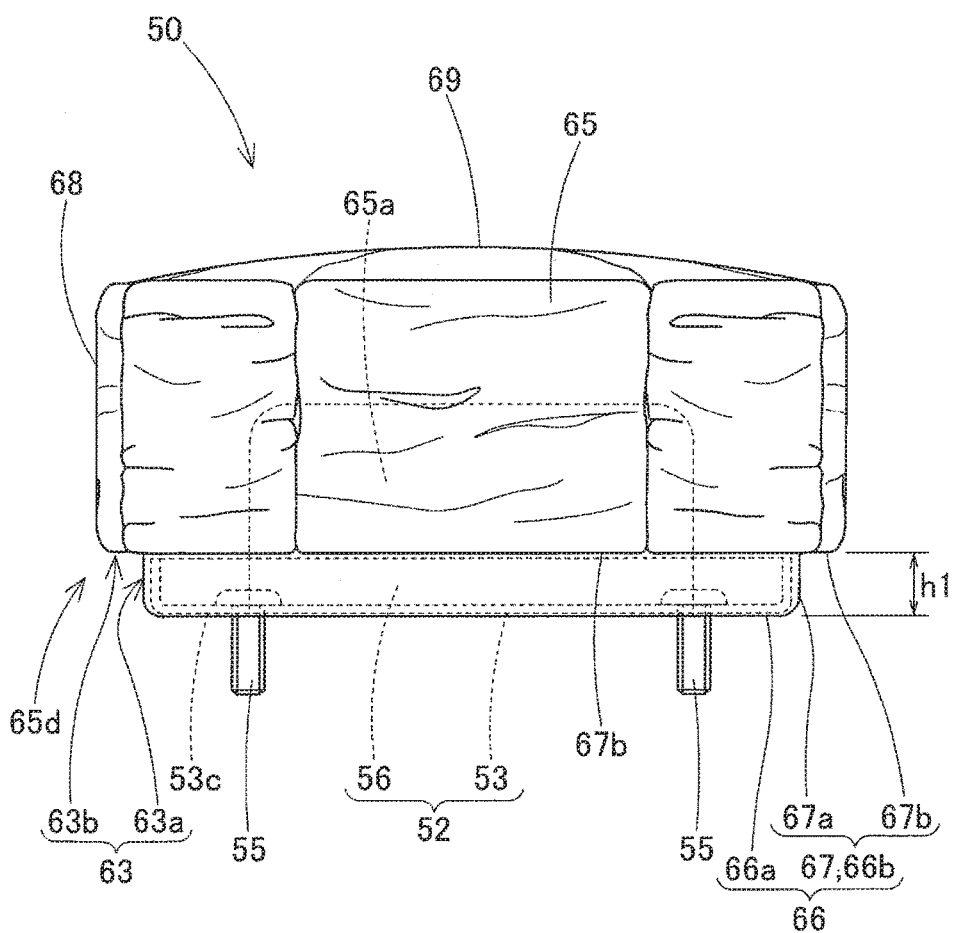
FIG. 7 is a schematic front view of the folded body of the state of assembling the retainer of the embodiment.
Figure 8:
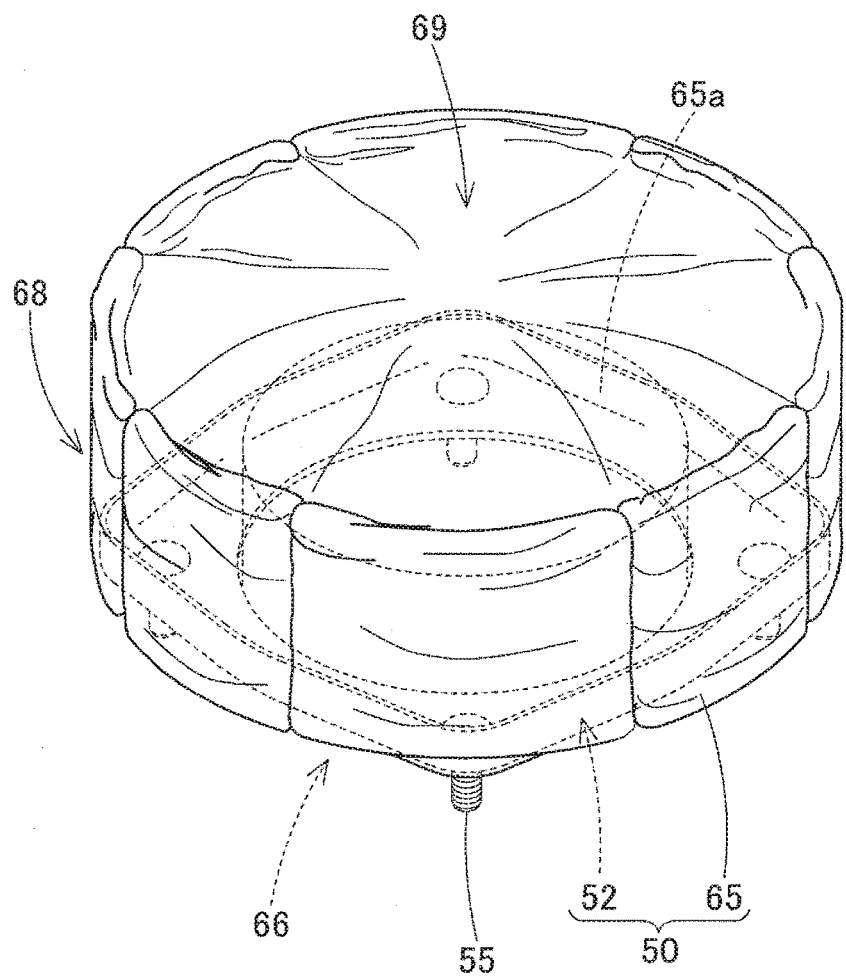
FIG. 8 is a schematic perspective view of the folded body of the state of assembling the retainer of the embodiment.
Figure 9:
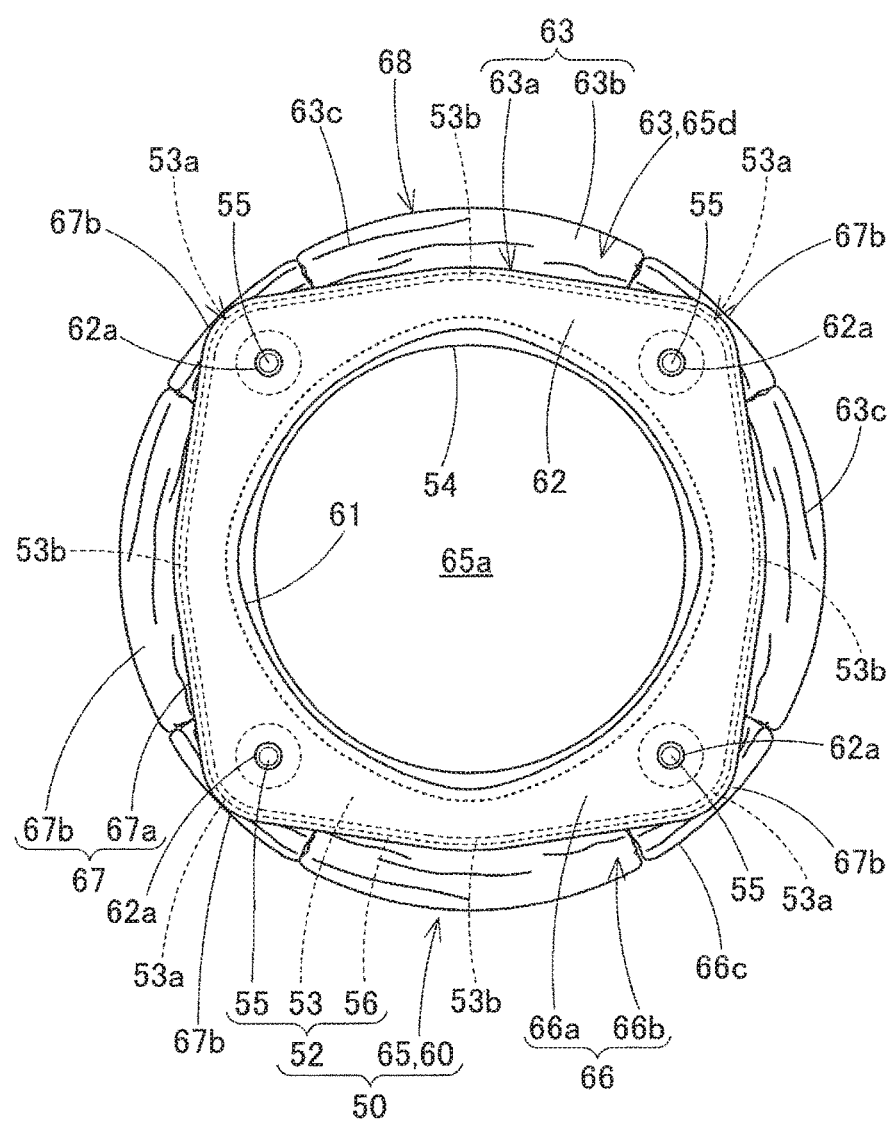
FIG. 9 is a schematic bottom view of the folded body of the state of assembling the retainer of the embodiment.

In the compression process using the bag cooling compressor 90, as illustrated in FIG. 16, the holding frame 83 after housing the folded body 65 extracted from the bag heating compressor 80 is set to the setting unit 92 of the molding main body unit 91. Then, as illustrated in FIG. 17, by inserting the pressing side unit 94 into the set holding frame 83, the folded body 65 is cooled while compressing, and the cooling compressed state is maintained for about 20 to 50 minutes. Further, the molding main body unit 91 may be cooled before the set of the folded body 65 by the cooling water passage 97, and may be cooled at the compression start or during compression. After a lapse of the predetermined time, inside the holding frame 83, the folded body 65 formed into a predetermined folded shape by assembling the retainer 52, that is, the completely folded body 50 having a durability to maintain the folded shape is formed. Then, on the lower surface 66 side of the folded body 65, as illustrated in FIGS. 6, 7 and 9, the housing recess 65a of the center side and the recess 65d of the outer peripheral edge side are formed.

The compression process of the embodiment is also referred to as a process of forming the folded body 65, by the compression molding that uses the molding die (the bag molding machines 80 and 90) that includes a holding frame 83 serving as one of split molds, and pressing side units 87 and 94 serving as the other of the split molds. In the compression process of the embodiment, without using the holding frame 83 to be shared, by providing a predetermined molding surface provided with the housing protrusion 85 and the stepped protrusion 86 in the molding main body units 81 and 91 of the bag molding machines 80 and 90, the folded body 65 may be formed from the molding main body units 81 and 91 of one of the split molds forming the molding die (bag molding machines 80 and 90) and the pressing side units 87 and 94 of the other of the split molds.

When assembling the airbag device 20 equipped with the folded body 65 (completely folded body 50), first, the completely folded body 50 is fitted to the inner circumferential surface 47a side of the side wall 47 of the airbag cover 40. Then, the respective bolts 55 of the completely folded body 50 are allowed to penetrate the through-holes 22b of the bag holder 21, and each locking leg 49 of the airbag cover 40 is inserted into the locking hole 22e of the bag holder 21, while each tongue portion 22f is bent outward so as to be locked to the inner projection 49a of the locking leg 49, the outside protrusion 49b of the locking leg 49 is locked to the inner peripheral edge of the outer edge side of the locking hole 22e, and the airbag cover 40 is attached to the bag holder 21. Each switch unit 26 is attached to the bag holder 21 in advance. Thereafter, each bolt 55 that protrudes from the bag holder 21 passes through the through-hole 38a of the inflator 35, a nut is engaged with each bolt 55, and if the completely folded body 50 (the folded body 65) and the inflator 35 are attached and fixed of the bag holder 21 after attaching the airbag cover 40, it is possible to assemble the airbag device 20.

In the mounting of the airbag device 20 on the vehicle, the locking head 31 of the assembling pins 29 of each switch unit 26 is inserted into the locking hole 11 of the fixing unit 10 of the steering wheel body 1 already assembled to the steering shaft SS, and if the locking head 31 is locked to the locking pin 12, it is possible to attach the airbag device 20 to the steering wheel body 1, the assembling of the steering wheel W is completed, and the steering wheel W and the airbag device 20 can be mounted on the vehicle.

At the time of attachment of the airbag device 20 to the steering wheel body 1, a lead wire (not illustrated) of the bag holder 21 is coupled to the positive electrode side of the horn switch actuation circuit, and a lead wire (not illustrated) for operation signal input is wired to the inflator 35.

After mounting on the vehicle, if the operation signal is input to the inflator 35, after the inflator 35 discharges the inflation gas from the gas discharge port 37, the folded airbag 60 is introduced with the inflation gas and inflates, pushes and open the door 42 of the ceiling wall 41 of the airbag cover 40, and protrudes from the opened opening of the door 42, and deploys and inflates to cover the upper surface of the ring R from the top of the boss B (see two-dot chain line of FIGS. 1 and 2).

During normal use in the non-operation of the inflator 35, in order to operate the horn switch mechanism 25, if the ceiling wall 41 of the airbag cover 40 is pressed down by the actuation stroke PS, the bag holder 21 is lowered via the folded body 65 having the shape retaining property abutting on the lower surface 41a of the ceiling wall 41 or the side wall 47 around the ceiling wall 41, and the movable side contact portion 28 of the switch unit 26 of the lower surface side of the switch support unit 22g of the bag holder 21 abuts against and comes into contact with the fixing side contact portion 30. Thus, the horn switch actuation circuit is turned ON, so that the predetermined horn is operated.

In the airbag device 20 of the embodiment, the folded body 65 of the airbag 60 that is configured to have the shape retaining property is formed to have the ceiling surface 65at of the housing recess 65a capable of housing the top 36a of the main body unit 36 of the inflator 35 between the top 36a of the main body unit 36 of the inserted inflator 35, as a shape provided with the clearance C1, without changing the distance between the ceiling wall 41 of the airbag cover 40 on the upper surface 69 of the folded body 65, that is, without lowering the upper surface 69 facing the ceiling wall 41, a decrease in volume of a compact folded shape can be adjusted by increasing the volume of the housing recess 65a. Therefore, even by pressing the ceiling wall 41 of the airbag cover 40, the ceiling wall 41 is slightly recessed by the clearance C2, is supported on the upper surface 69 of the folded body 65 having the shape retaining property, is not largely bent, and does not reduce the tactility of the ceiling wall 41 of the airbag cover 40. Of course, since the folded body 65 itself also supports the side wall 65c of the periphery of the housing recess 65a by the bag holder 21, via the peripheral edge 62 of the inflow opening 61, the upper surface 69 side of the folded body 65 supporting the ceiling wall 41 is not lowered, and as a result, the ceiling wall 41 of the airbag cover 40 supported by the upper surface 69 of the folded body 65 is not lowered, and tactility of the ceiling wall 41 is not reduced.

As in an airbag device 200 of Comparative Example illustrated in FIG. 18, using the same airbag 60 as the folded body 65 of the embodiment, in the folded body 650 provided with the housing recess 650a having the volume to fit the top 36a of the main body unit 36 of the inflator 35, between the upper surface 69 and the lower surface 41a of the ceiling wall 41 of the airbag cover 40, a large clearance C20 is generated, and when pressing the ceiling wall 41, the ceiling wall 41 is largely recessed until coming into contact with the upper surface 69 of the folded body 650, and the tactility of the ceiling wall 41 of the airbag cover 40 is deteriorated. By the way, the housing recess 650a of this folded body 650 has the volume equivalent to the top 36a side of the main body unit 36 of the inflator 35 fitted to the housing recess 650a.

Figure 19:
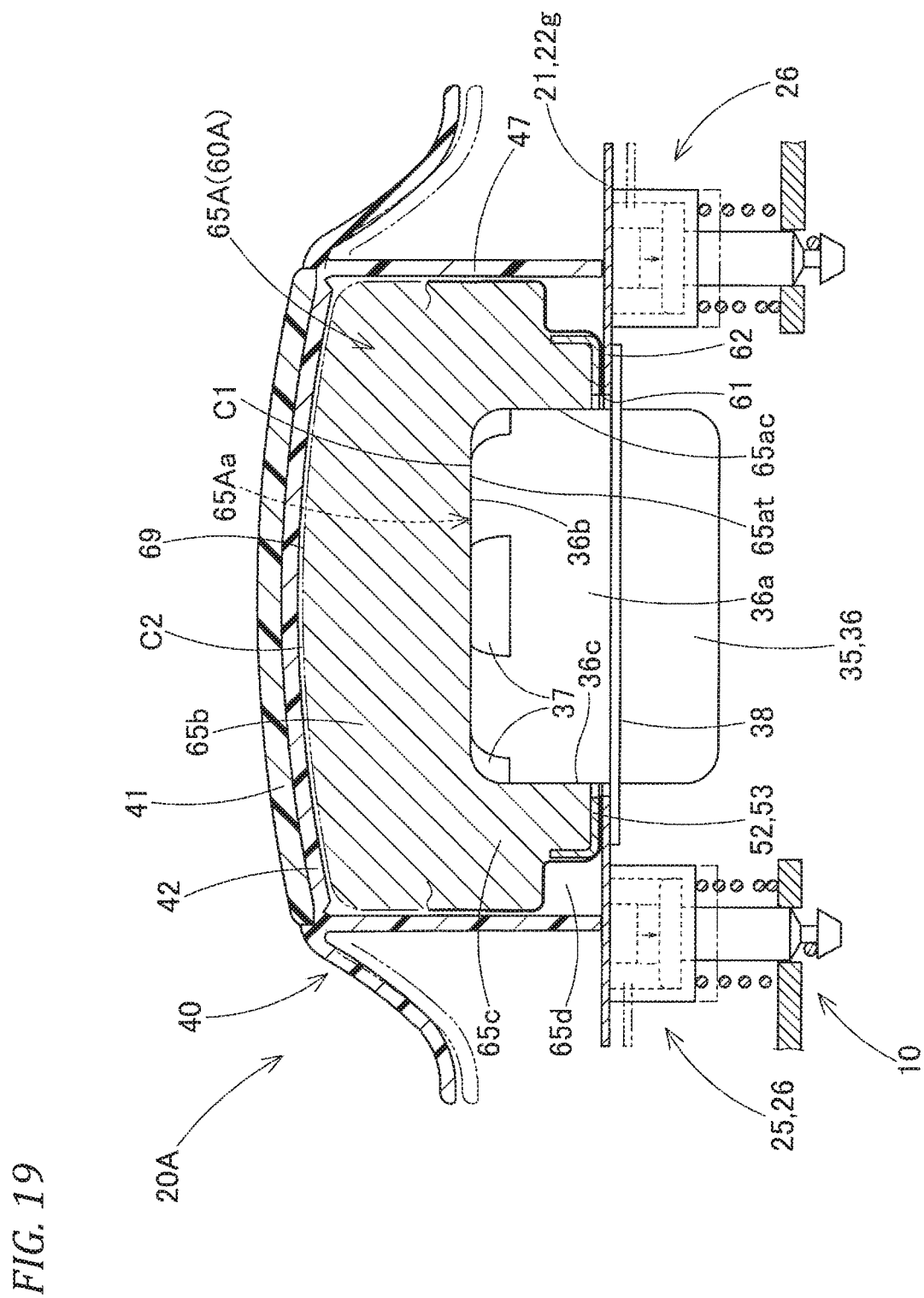
FIG. 19 is a schematic vertical sectional view of an airbag device of a modified example of the embodiment.

As in the airbag device 20A of the modified example illustrated in FIG. 19, if the folded body 65A provided by folding the airbag 60A increases in volume from the folded body 65 provided by folding the airbag 60 of the embodiment, only by setting the housing recess 65Aa to a volume smaller than the housing recess 65a, as the airbag device 20A, by the use of the bag holder 21 provided with the same switch unit 26 as the airbag device 20, the inflator 35, the airbag cover 40, the retainer 52 and the like, the airbag device can be formed. Incidentally, the housing recess 65Aa is configured as the volume equivalent to the top 36a so as to be able to fit the top 36a side of the main body unit 36 of the inflator 35.

Figure 20:
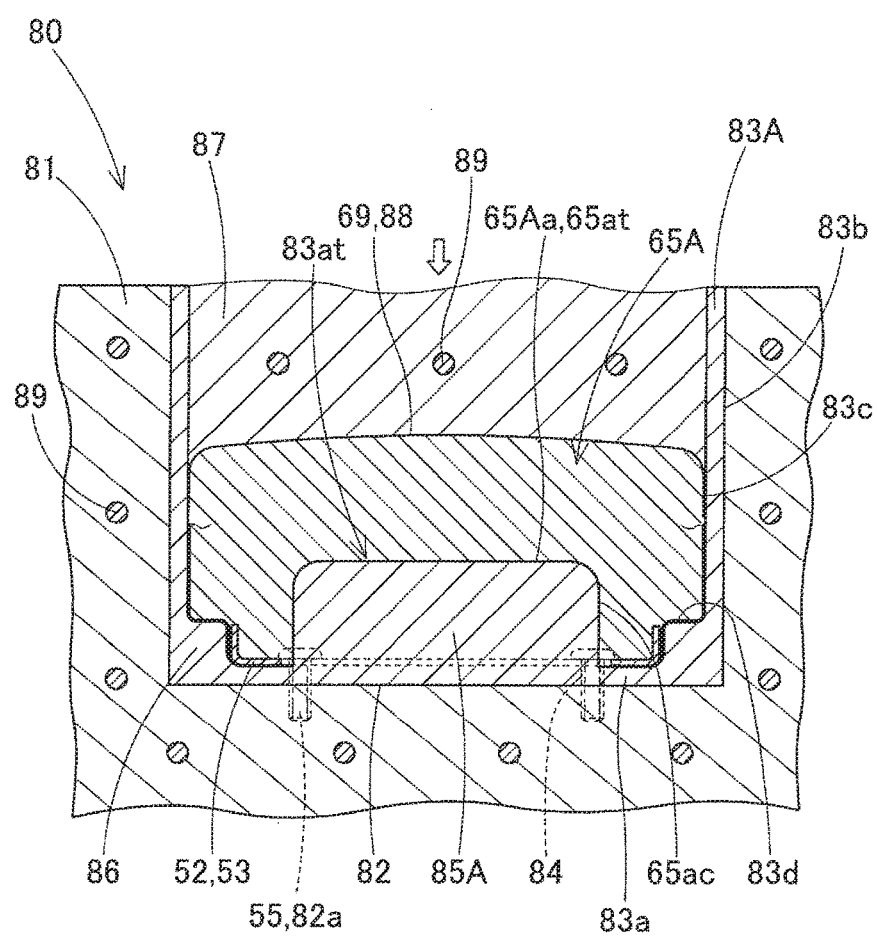
FIG. 20 is a diagram illustrating the compression process for forming the folded body of the airbag of the airbag device illustrated in FIG. 19.
Figure 21:
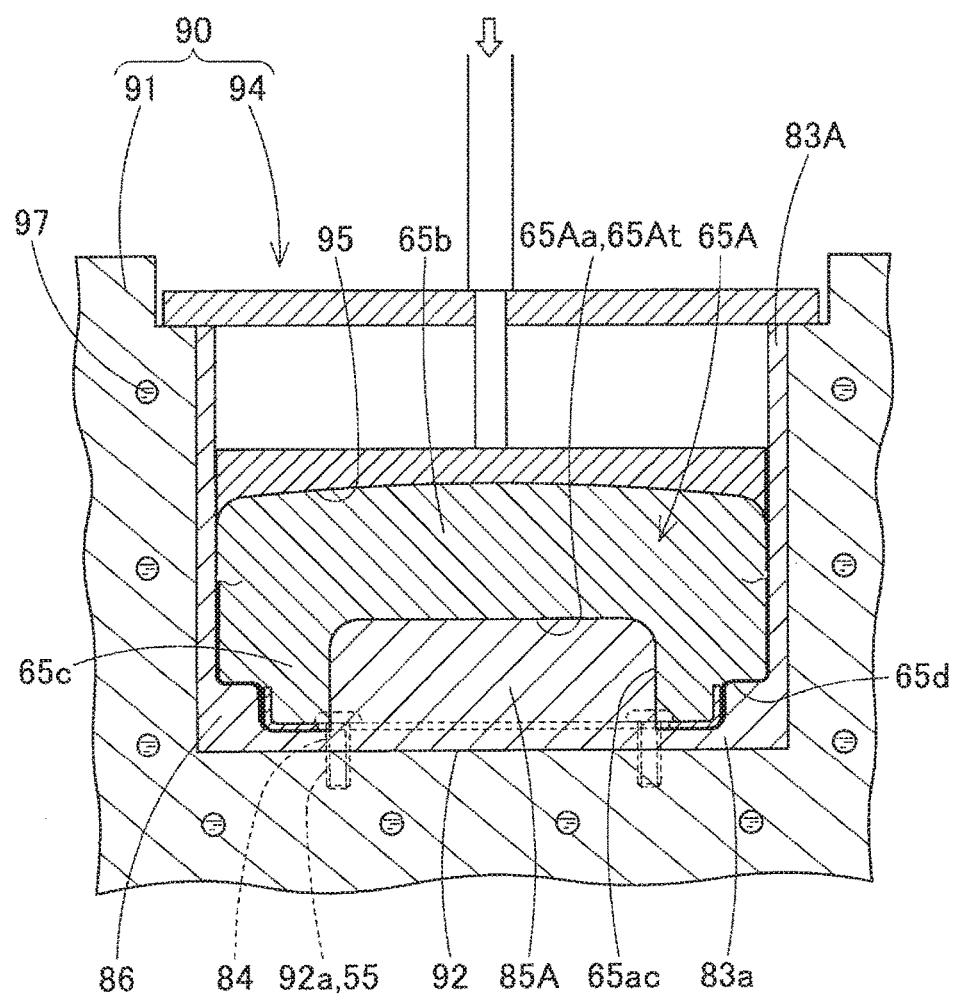
FIG. 21 is a diagram illustrating the compression process for forming the folded body of the airbag of the airbag device illustrated in FIG. 19, and illustrating a subsequent process of FIG. 20.

When forming such a folded body 65A, like the airbag 60, if utilizing the folding process and the compression process using the bag folding machine 70 and the bag molding machines 80 and 90, it is possible to easily form the folded body 65A from the airbag 60A. However, as illustrated in FIGS. 20 and 21, the holding frame 83A used in the compression process, housing protrusion 85A forming the housing recess 65Aa is formed to be a small shape in correspondence with the housing recess 65Aa, as compared to the housing protrusion 85 of the holding frame 83 of FIGS. 15 and 17.

Therefore, in the airbag device 20 of the embodiment, the folded body 65 of the airbag 60 is made compact than the folded body 65A, by a simple handling of providing a predetermined clearance C1 between the ceiling surface 65at of the housing recess 65a and the top 36a of the main body unit 36 of the inflator 35, it is possible to suppress a decrease in tactility of the ceiling wall 41 of the airbag cover 40 that covers the folded body 65.

Furthermore, in the airbag device 20 of the embodiment, the clearance dimension C1L between the ceiling surface 65at of the housing recess 65a and the top 36a of the main body unit 36 the inflator 35 is set to be larger than the clearance dimension C2L between the upper surface 69 of the folded body 65 and the ceiling wall 41 of the airbag cover 40.

Therefore, in the embodiment, because the clearance dimension C2L between the upper surface 69 of the folded body 65 and the ceiling wall 41 of the airbag cover 40 is smaller than the clearance dimension C1L between the ceiling surface 65at of the housing recess 65a and the top 36a of the main body unit 36 of the inflator 35, if the ceiling wall 41 of the airbag cover 40 is lowered, the ceiling wall 41 is immediately supported by the upper surface 69 of the folded body 65 having the shape retaining property, recessing of the ceiling wall 41 is restricted, and it is possible to obtain the good tactility of the ceiling wall 41.

In the airbag device 20 of the embodiment, the airbag cover 40 is configured to include the ceiling wall 41, and the side wall 47 which extends downward from the peripheral edge of the door 42 of the ceiling wall 41, covers the outer circumferential surface 68 side of the folded body 65 and is attached to the bag holder 21. Also, the horn switch mechanism 25 that is disposed so as to be interposed between the bag holder 21 and the steering wheel body 1 as a mounting part for mounting the airbag device 20 from the lower side of the bag holder 21, is capable of operating the horn by moving the bag holder 21 downward to the steering wheel body 1 side by the actuation stroke PS, and is disposed on the steering wheel body 1 side in the bag holder 21. Specifically, the bag holder 21 includes a plurality of switch units 26 constituting the horn switch mechanism 25 for attaching the airbag device 20 to the fixing unit 10 of the steering wheel main body 1 as the mounting part on the lower surface side. The switch unit 26 is configured so that the movable side contact portion 28 of the airbag device 20 side and the fixing side contact portion 30 of the mounting part 10 side are disposed to be spaced apart from each other by the coil spring 32 as a biasing means by the actuation stroke SP, and the movable side contact portion 28 is disposed to come into contact with to the fixing side contact portion 30, when pressing the airbag cover 40.

Therefore, in the embodiment, when pressing the ceiling wall 41 of the airbag cover 40 in order to operate the horn switch mechanism 25, the ceiling wall 41 is supported on the upper surface 69 of the folded body 65 having the shape retaining property, and the folded body 65 itself supports the side wall 65c of the part around the housing recess 65a on the bag holder 21 via the peripheral edge 62 of the inflow opening 61. Thus, it is possible to immediately bring the movable side contact portion 28 of the switch unit 26 of the lower surface side of the bag holder 21 into close contact with the fixing side contact portion 30. Then, if a depressing amount of the ceiling wall 41 of the airbag cover 40 is equivalent to the actuation stroke PS, the bag holder 21 moves downward by the actuation stroke, and thus, the movable side contact portion 28 of the switch unit 26 of the horn switch mechanism 25 disposed on the lower surface side of the bag holder 21 can be brought into contact with the fixing side contact portion 30 so that the horn switch mechanism 25 operates the horn. As a result, in the airbag device 20 of the embodiment, since the depressing amount of the ceiling wall 41 during operation of the horn switch mechanism 25 can be equivalent to the actuation stroke PS of the horn switch mechanism 25, it is possible to operate the horn switch mechanism 25 with improved tactility.

In the embodiment, although the horn switch mechanism 25 is configured by using the switch unit 26 that has the fixing side contact portion 30 and the movable side contact portion 28 and can be assembled to the bag holder 21, the horn switch mechanism may be configured without using the switch unit. For example, the horn switch mechanism may be configured so that a predetermined number of the fixing side contact portions 30 are disposed on the steering wheel body 1 side, the corresponding movable side contact portions 28 are disposed on the bag holder 21 side, and the coil spring 32 as a biasing means is disposed between the bag holder 21 and the steering wheel body 1 of a position different from contact portion or a position near the contact portion.

In the manufacturing method of the airbag device 20 of the embodiment, the folded body 65 is manufactured, after passing through the folding process of folding the airbag 60, by passing through the compression process of performing the compression molding using the molding die (the bag molding machines (molding dies) 80 and 90 provided with the holding frame 83) provided with the housing protrusion 85 capable of forming the housing recess 65a, and by shaping the airbag in the folded shape capable of being housed between the airbag cover 40 and the bag holder 21.

Therefore, in the embodiment, the housing recess 65a of the folded body 65 can be formed by reducing the number of manufacturing processes as compared with the case of shaping using sewing or adhesive, and it is possible to easily obtain the folded shape of the folded body having durability by including the housing recess 65a of a predetermined shape.

By simply changing the housing protrusion 85 of the holding frame 83 serving as a split mold for forming the molding die from housing protrusion 85A (see FIGS. 20 and 21), it is possible to change the shape of the housing recess 65a, and it is possible to easily cope with the change in the volume of the airbag 60 itself, without adjusting the airbag cover 40 and the inflator 35. In the embodiment, in order to change the housing protrusions 85 and 85A, the holding frames 83 and 83A are replaced. However, if it is configured to replace only the part of the housing protrusions 85 and 85A, it is possible to share the main body unit of the holding frame excluding the part of the housing protrusions 85 and 85A.

In the embodiment, at the time of the compression process of compressing and molding the folded body 65, the folded body 65 is formed via the two-stage compression process of the heating compression process using the bag molding machine (bag heating compressor and molding die) 80, and the cooling compression process using the bag molding machine (bag cooling compressor and molding die) 90. As long as it is easy to maintain the folded shape, the folded body 65 may be formed by omitting the cooling compression process, and by the heating compressing process using the bag molding machine (bag heating compressor) 80.

In order to maintain the folded shape of the folded body 65, when shaping the airbag 60 in a predetermined folded shape so as to be folded, the compression molding is performed to clamp the holding frame 83 and the pressing side units 87 and 94 forming the molding die, and by sucking the surrounding air, by utilizing the compression molding so as to be pressed by the blast, the folded body 65 provided with the housing recess 65a and the recess 65d may be formed.

In the embodiment, when folding the airbag 60, the driver's side panel 60b and the vehicle body side panel 60c are deployed to be flat, and the outer peripheral edge 60d is folded so as to be collected to the retainer 52 side. However, as long as a configuration in which the airbag is folded to be collected to the upper side of the bottom wall of the retainer is provided, while venting gas from a state of being inflated, or the airbag may be folded to be collected to the upper side of the bottom wall of the retainer, or the airbag may be folded to be collected to the upper side of the bottom wall of the retainer, while being twisted, and the folding process of folding the airbag 60 is not limited to the embodiments.

In the embodiment, although the folded body 65 was illustrated as a substantially columnar shape, as long as the folded body 65 has the housing recess 65a, the folded body may be shaped in a polygonal column shape such as a quadrangular prism.

In the folded body 65 of the embodiment, the stepped surface 67 formed by the recess 65d is disposed in a part continuing from the bottom wall cover 66a of the bottom wall separation part 66b of the lower surface 66 of the folded body 65, and the stepped surface 67 has the vertical surface 67a that is bent upward from the bottom wall cover 66a, and the horizontal surface 67b located above the bottom wall cover 66a from the upper end 67at of the vertical surface 67a and extending to the outer peripheral edge 66c side of the bottom wall separation part 66b. That is, as long as the horizontal surface 67b of the stepped surface 67 is configured to disposed at a position that is hard to be caught, the bolt 55 as the fixing means is separated upward from the base plate 22 of the bag holder 21 as a housing part for fixing the bolt 55 by the distance (height dimension h1) offset upward from the bottom wall cover 66a at the clearance H (see FIG. 3), it is possible to prevent the part of the stepped surface 67 of the bottom wall separation part 66b and the vicinity part 66e (see FIG. 7) thereof from being caught between the base plate 22 of the bag holder 21 and the bottom wall 53 of the retainer 52, and it is possible to smoothly assemble the airbag device 20. By the way, when a part of the peripheral wall 60a other than the attachment portion 62 of the airbag 60 is caught the between the base plate 22 of the bag holder 21 and the bottom wall 53 of the retainer 52, the airbag 60 may not be inflated to a completely inflated shape, which is not preferable.

In the embodiment, although the airbag device 20 mounted on the steering wheel W has been described, as long as there is provided a configuration which includes the folded body obtained by folding the airbag to have a shape retaining property, the airbag cover that covers the upper surface of the folded body and has the ceiling wall having the door that is opened by being pushed to the airbag at the time of expansion, the inflator that supplies an inflation gas, and the bag holder that holds the airbag, the invention can be applied to the airbag device for a passenger's seat or the like.

What is claimed is:

1. An airbag device comprising:
an airbag having an inflow opening for introducing an inflation gas, the airbag being formed in a folded body by being folded to be inflatable;
a bag holder attached to a peripheral edge of the inflow opening to hold the airbag;
an airbag cover covering a peripheral edge of the folded body, the airbag cover being attached to the bag holder;
an inflator disposed by inserting an upper side, on which a gas discharge port for discharging the inflation gas is disposed, in the folded body from the inflow opening, the inflator being held in the bag holder; and
a flange is provided below the bag holder, wherein:
the airbag cover has a ceiling wall that covers an upper surface of the folded body remote from the inflow opening of the folded body, the ceiling wall having a door that is opened by being pushed by the airbag when inflated;
the folded body is equipped with a housing recess that has a shape retaining property capable of supporting the ceiling wall of the airbag cover and is capable of housing a top of a main body unit of the inflator;
a part around the housing recess is supported by the bag holder;
a ceiling surface of the housing recess is formed as a shape in which a clearance is provided between the ceiling surface of the housing recess and the top of the main body unit of the inserted inflator;
a retainer configured to attach and fix the airbag to the bag holder; and
an annular recess located at a lower end side of the airbag, the annular recess surrounds the retainer and the housing recess.

2. The airbag device of claim 1, wherein
the airbag cover further includes the ceiling wall and a side wall that extends downward from the peripheral edge of the door of the ceiling wall, covers an outer peripheral side of the folded body and is attached to the bag holder; and
a horn switch mechanism is disposed on a mounting part side of the bag holder, and is disposed to be interposed between the bag holder and a mounting part for mounting the airbag device from the lower side of the bag holder, and is configured to operate a horn by moving the bag holder downward to the mounting part side by an actuation stroke.

3. An airbag device comprising:
an airbag having an inflow opening for introducing an inflation gas, the airbag being formed in a folded body by being folded to be inflatable;
a bag holder attached to a peripheral edge of the inflow opening to hold the airbag;
an airbag cover covering a peripheral edge of the folded body, the airbag cover being attached to the bag holder; and
an inflator disposed by inserting an upper side, on which a gas discharge port for discharging the inflation gas is disposed, in the folded body from the inflow opening, the inflator being held in the bag holder, wherein:
the airbag cover has a ceiling wall that covers an upper surface of the folded body remote from the inflow opening of the folded body, the ceiling wall having a door that is opened by being pushed by the airbag when inflated;
the folded body is equipped with a housing recess that has a shape retaining property capable of supporting the ceiling wall of the airbag cover and is capable of housing a top of a main body unit of the inflator;
a part around the housing recess is supported by the bag holder;
a ceiling surface of the housing recess is formed as a shape in which a clearance is provided between the ceiling surface of the housing recess and the top of the main body unit of the inserted inflator;
a first clearance dimension between the ceiling surface of the housing recess and the top of the main body unit of the inflator is set to be larger than a second clearance dimension between the upper surface of the folded body and the ceiling wall of the airbag cover; and
the second clearance dimension between the upper surface of the folded body and the ceiling wall of the airbag cover is larger than zero at a whole area of the upper surface of the folded body.

4. The airbag device of claim 3, further comprising
a retainer configured to attach and fix the airbag to the bag holder, and
an annular recess located at a lower end side of the airbag, the annular recess surrounds the retainer and the housing recess.

* * * * *